US012800171B2

(12) United States Patent
Gavin et al.

(10) Patent No.: US 12,800,171 B2
(45) Date of Patent: Nov. 17, 2026

(54) BUILDING EQUIPMENT WITH EMBEDDED CONNECTIVITY AND PHYSICAL ADAPTATIONS

(71) Applicant: Tyco Fire & Security GmbH, Neuhausen am Rheinfall (CH)

(72) Inventors: Gary W. Gavin, Franklin, WI (US); James Williams, Milwaukee, WI (US); Kaleb Luedtke, Milwaukee, WI (US); Ezra M. Imes, West Allis, WI (US); Trent M. Swanson, Wellington, FL (US); Murali R. Namburi, Milwaukee, WI (US); Eric G. Lang, Milwaukee, WI (US); Nils A Bergman, Minneapolis, MN (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 75 days.

(21) Appl. No.: 18/894,954

(22) Filed: Sep. 24, 2024

(65) Prior Publication Data

US 2025/0102175 A1 Mar. 27, 2025

Related U.S. Application Data

(60) Provisional application No. 63/540,530, filed on Sep. 26, 2023.

(51) Int. Cl.
*F24F 11/56* (2018.01)
*H01Q 1/22* (2006.01)

(52) U.S. Cl.
CPC .......... *F24F 11/56* (2018.01); *H01Q 1/2291* (2013.01)

(58) Field of Classification Search
CPC .............................. F24F 11/56; H01Q 1/2291
See application file for complete search history.

(56) References Cited

U.S. PATENT DOCUMENTS

| | | | |
|---|---|---|---|
| 6,955,302 | B2 | 10/2005 | Erdman |
| 9,599,359 | B2 | 3/2017 | Kowald et al. |
| 9,621,514 | B2 | 4/2017 | Gilde et al. |
| 9,638,436 | B2 | 5/2017 | Arensmeier et al. |
| 10,006,654 | B2 | 6/2018 | Shaull et al. |
| 10,007,513 | B2 | 6/2018 | Malladi et al. |
| 10,038,725 | B2 | 7/2018 | Mattes et al. |

(Continued)

FOREIGN PATENT DOCUMENTS

| | | | |
|---|---|---|---|
| WO | WO-2023/129697 | A1 | 7/2023 |
| WO | WO-2023/167862 | A1 | 9/2023 |

OTHER PUBLICATIONS

International Search Report and Written Opinion on PCT Appl. No. PCT/US2024/048197 dated Dec. 19, 2024 (16 pages).

(Continued)

*Primary Examiner* — Seung H Lee
(74) *Attorney, Agent, or Firm* — Foley & Lardner LLP

(57) ABSTRACT

A chiller includes cooling components configured to chill a fluid, a housing coupled to the cooling components, an antenna positioned at an exterior of the housing, a circuit board positioned in the housing and comprising a plurality of mounting points, an antenna mount fastened to the plurality of mounting points such that the antenna mount is disposed over a portion of the circuit board, and a cable extending from the antenna mount to the antenna via a hole in the housing.

20 Claims, 12 Drawing Sheets

(56) References Cited

U.S. PATENT DOCUMENTS 10,127,022 B2 11/2018 Sharma et al.
10,178,133 B2 1/2019 Mattes et al.
10,402,360 B2 9/2019 Cayemberg et al.
10,564,941 B2 2/2020 Lucas et al.
10,572,230 B2 2/2020 Lucas et al.
10,797,993 B2 10/2020 Ahrenholz et al.
10,911,418 B1 2/2021 Fuchs et al.
10,977,010 B2 4/2021 Sharma et al.
10,999,154 B1 5/2021 Ahrenholz et al.
11,048,498 B2 6/2021 Malladi et al.
11,226,795 B2 1/2022 Lucas et al.
11,272,011 B1 3/2022 Laughton et al.
11,567,466 B1 1/2023 Galvez et al.
12,184,444 B2 * 12/2024 Park .................... H04L 12/2812
2004/0234338 A1 * 11/2004 Monroe ............... B67D 7/3218
405/52
2005/0206530 A1 * 9/2005 Cumming .............. G01D 4/006
700/295
2013/0064386 A1 3/2013 Yerrace et al.
2015/0323917 A1 11/2015 Majewski et al.
2016/0109871 A1 4/2016 Phillips
2016/0209068 A1 7/2016 Castillo et al.
2018/0119972 A1 5/2018 Trikha et al.
2018/0261915 A1 * 9/2018 Rogers ................... H02G 13/60
2019/0072419 A1 * 3/2019 Przybylski ............... F24F 11/89
2020/0327371 A1 10/2020 Sharma et al.
2021/0153295 A1 5/2021 Harper et al.
2022/0022747 A1 * 1/2022 Malfavon ............ A61B 5/0008
2022/0090805 A1 3/2022 Vitullo et al.
2023/0066138 A1 3/2023 Gottschalk et al.
2023/0205189 A1 6/2023 Joshi et al.
2023/0213901 A1 7/2023 Galvez et al.
2023/0213902 A1 7/2023 Galvez et al.
2023/0213903 A1 7/2023 Galvez et al.
2023/0213909 A1 7/2023 Galvez et al.
2023/0216742 A1 7/2023 Galvez et al.
2023/0217361 A1 7/2023 Galvez et al.
2023/0280703 A1 9/2023 Galvez et al.
2023/0315031 A1 10/2023 Samy et al.
2023/0315032 A1 10/2023 Samy et al.
2023/0315079 A1 10/2023 Risbeck et al.
2023/0316066 A1 10/2023 Jiang et al.
2023/0417439 A1 12/2023 Reichl
2024/0004357 A1 1/2024 Galvez et al.
2024/0168445 A1 5/2024 Galvez et al.
2024/0288193 A1 8/2024 Khan et al.

OTHER PUBLICATIONS

U.S. Appl. No. 17/710,443, filed Mar. 31, 2022, Johnson Controls Tyco IP Holdings LLP.
U.S. Appl. No. 17/710,597, filed Mar. 31, 2022, Samy et al.
U.S. Appl. No. 17/710,706, filed Mar. 31, 2022, Johnson Controls Tyco IP Holdings LLP.
U.S. Appl. No. 18/115,447, filed Feb. 28, 2023, Khan et al.
U.S. Appl. No. 18/882,664, filed Sep. 11, 2024, Przybylski et al.
U.S. Appl. No. 18/882,673, filed Sep. 11, 2024, Przybylski et al.
U.S. Appl. No. 18/882,675, filed Sep. 11, 2024, Przybylski et al.
U.S. Appl. No. 18/882,680, filed Sep. 11, 2024, Przybylski et al.
U.S. Appl. No. 18/882,683, filed Sep. 11, 2024, Przybylski et al.

* cited by examiner

BUILDING EQUIPMENT WITH EMBEDDED CONNECTIVITY AND PHYSICAL ADAPTATIONS

CROSS-REFERENCE TO RELATED APPLICATIONS

This application claims the benefit of and priority to U.S. Provisional Patent Application No. 63/540,530 filed Sep. 26, 2023, the entire disclosure of which is incorporated by reference herein in its entirety.

BACKGROUND

The present disclosure relates generally to the field of building equipment for a building and more particularly to chillers and other units of building equipment. Conventionally, chillers and other equipment include control circuitry which controls internal operations of the chiller or other equipment but is not adapted for direct communications with external networks. Additional controllers, gateways, etc. thus need to be installed at a building site by technicians in the field if connectivity between a chiller and a building management system or smart building platform (e.g., cloud-based management platform) is desired. However, such additional installation and configuration is time-consuming and error prone and provides only limited data transfer between onboard control hardware of chillers (or other equipment) and external computing systems.

SUMMARY

One implementation of the present disclosure is a chiller. The chiller includes cooling components configured to chill a fluid, a housing coupled to the cooling components, an antenna positioned at an exterior of the housing, a circuit board positioned in the housing and including a plurality of mounting points, an antenna mount fastened to the plurality of mounting points such that the antenna mount is disposed over a portion of the circuit board, and a cable extending from the antenna mount to the antenna via a hole in the housing.

In some embodiments, the chiller includes an additional antenna positioned at an exterior of the housing and an additional cable extending from the antenna mount to the additional antenna via the hole or an additional hole in the housing. In some embodiments, the antenna provides for cellular communications and the additional antenna provides for WiFi communications.

In some embodiments, the antenna mount is positioned in a center region of the circuit board spaced away from edges of the circuit board. The cable can be coupled to the antenna mount at a proximal end of the cable such that the proximal end of the cable is substantially parallel with the circuit board over the center region of the circuit board. The proximal end of the cable can extend from the antenna mount in a first direction towards a first edge of the edges of the circuit board, while the first edge of the circuit board is positioned along a wall of the housing.

In some embodiments, the chiller also includes a control board spaced apart from the circuit board. The control board can output control signals to the cooling components of the chiller, while the circuit board enables communications between the chiller and a network external to the chiller. The circuit board can receive an update from the control board via the network and install the update on the control board. The chiller can include a first communication channel between the control board and the circuit board and a second communication channel between the control board and the circuit board, where the second communications channel provides higher bandwidth communications than the first communication channel.

In some embodiments, the housing includes a door openable to provide access to the circuit board from outside the housing. In some embodiments, the chiller includes an ethernet port coupled to the circuit board.

Another implementation of the present disclosure is a system. The system includes a chiller. The chiller includes cooling components configured to chill a fluid, a housing coupled to the cooling components, a first antenna and a second antenna positioned at an exterior of the housing, a circuit board positioned in the housing and including a plurality of mounting points, an antenna mount fastened to the plurality of mounting points such that the antenna mount is disposed over a portion of the circuit board, and a first cable extending from the antenna mount to the first antenna and a second cable extending from the antenna mount to the second antenna. The system also includes a first device separate from the chiller and communicable with the circuit board via the first antenna using a first type of wireless communication and a second device separate from the chiller and communicable with the circuit board via the second antenna using a second type of wireless communication.

In some embodiments, the first type of communications is cellular communications and the second type of communications is WiFi communications. In some embodiments, the first type of communications is cellular communications and the second type of communications is Bluetooth communications. In some embodiments, an ethernet port is coupled to the circuit board.

In some embodiments, the antenna mount is positioned in a center region of the circuit board spaced away from edges of the circuit board. The first cable may be coupled to the antenna mount at a proximal end of the first cable such that the proximal end of the first cable is substantially parallel with the circuit board over the center region of the circuit board. The proximal end of the first cable can extend from the antenna mount in a first direction towards a first edge of the edges of the circuit board, while the first edge of the circuit board is positioned along a wall of the housing.

In some embodiments, the chiller also includes a control board spaced apart from the circuit board. The circuit board is programmed to execute an algorithm that determines a control setting to be used by the control board, and the control board has insufficient computing resources to execute the algorithm.

Another implementation of the present disclosure is a method. The method includes installing, at a factory, a circuit board in a chiller, coupling, at the factory, an antenna mount to a plurality of mounting points of the circuit board, connecting, with a cable, the antenna mount to an antenna included with the chiller, delivering the chiller to a building site, and connecting, via the antenna, the circuit board to a wireless communications network at the building site.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods for embedded connectivity of chillers (or other building equipment) are shown, according to various embodiments.

Building HVAC Systems and Building Management Systems

Figure 1:
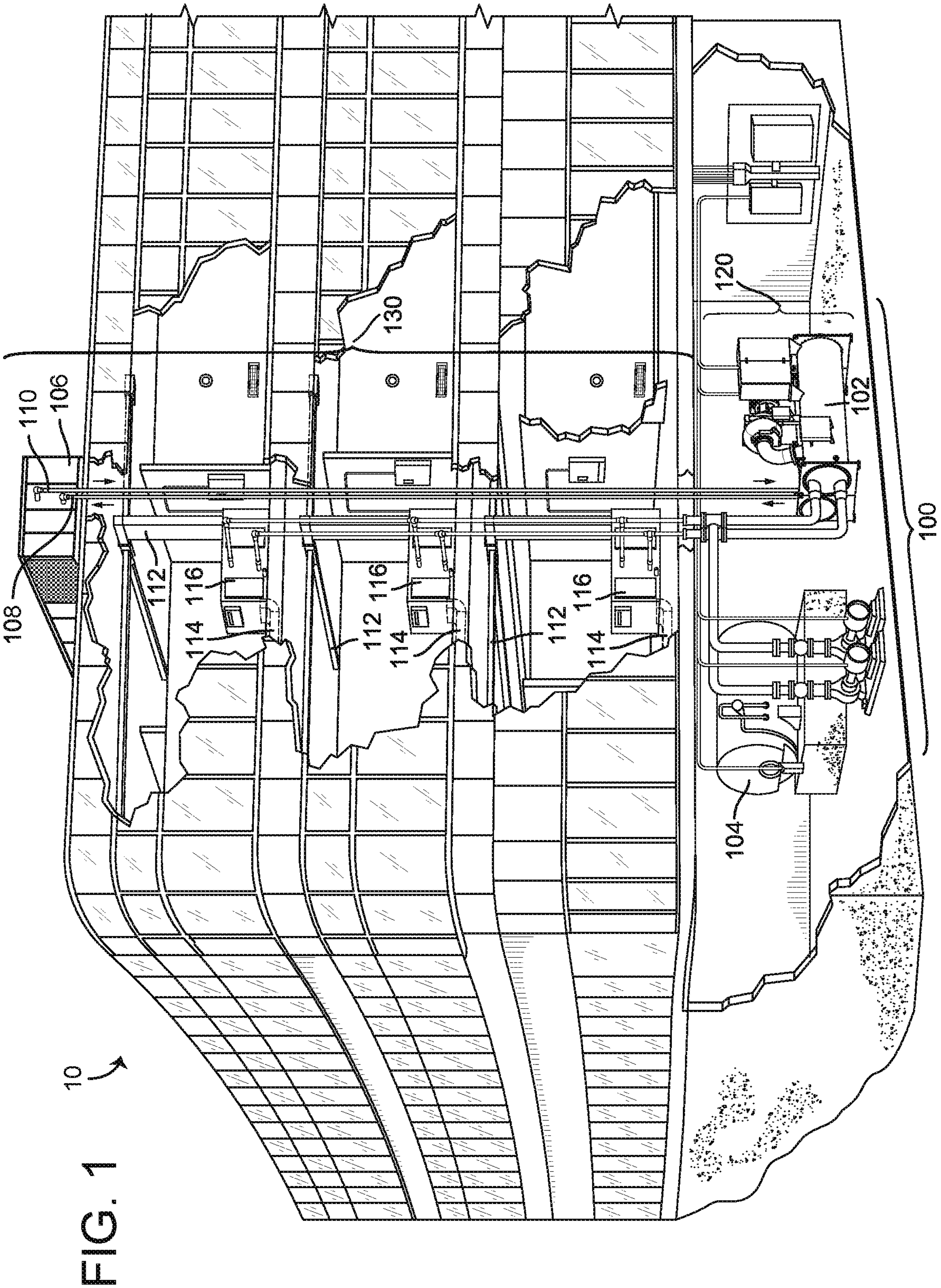
FIG. 1 is a drawing of a building equipped with a HVAC system, according to some embodiments.
Figure 2:
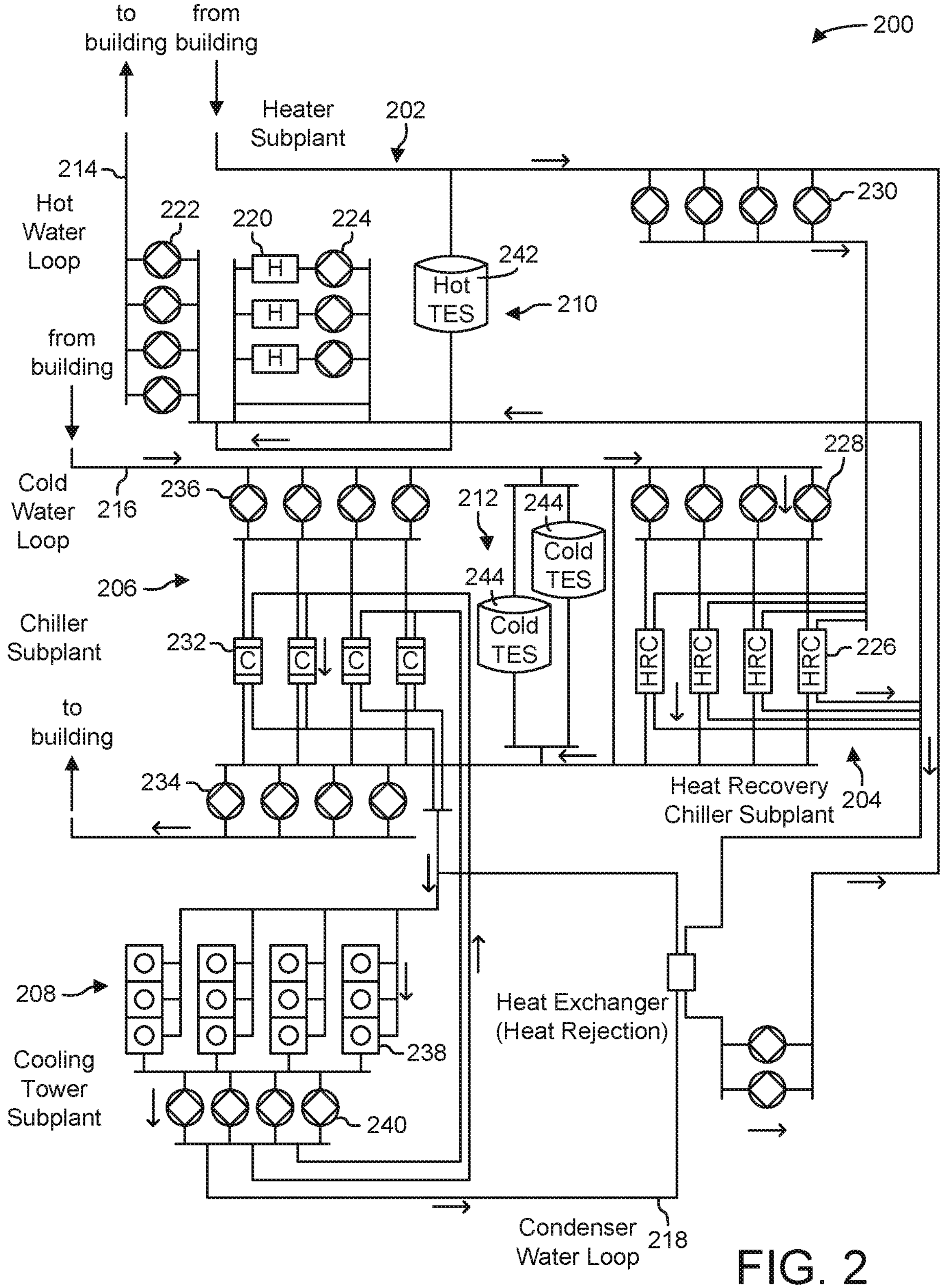
FIG. 2 is a block diagram of a waterside system which can be used to serve the heating or cooling loads of the building of FIG. 1, according to some embodiments.
Figure 3:
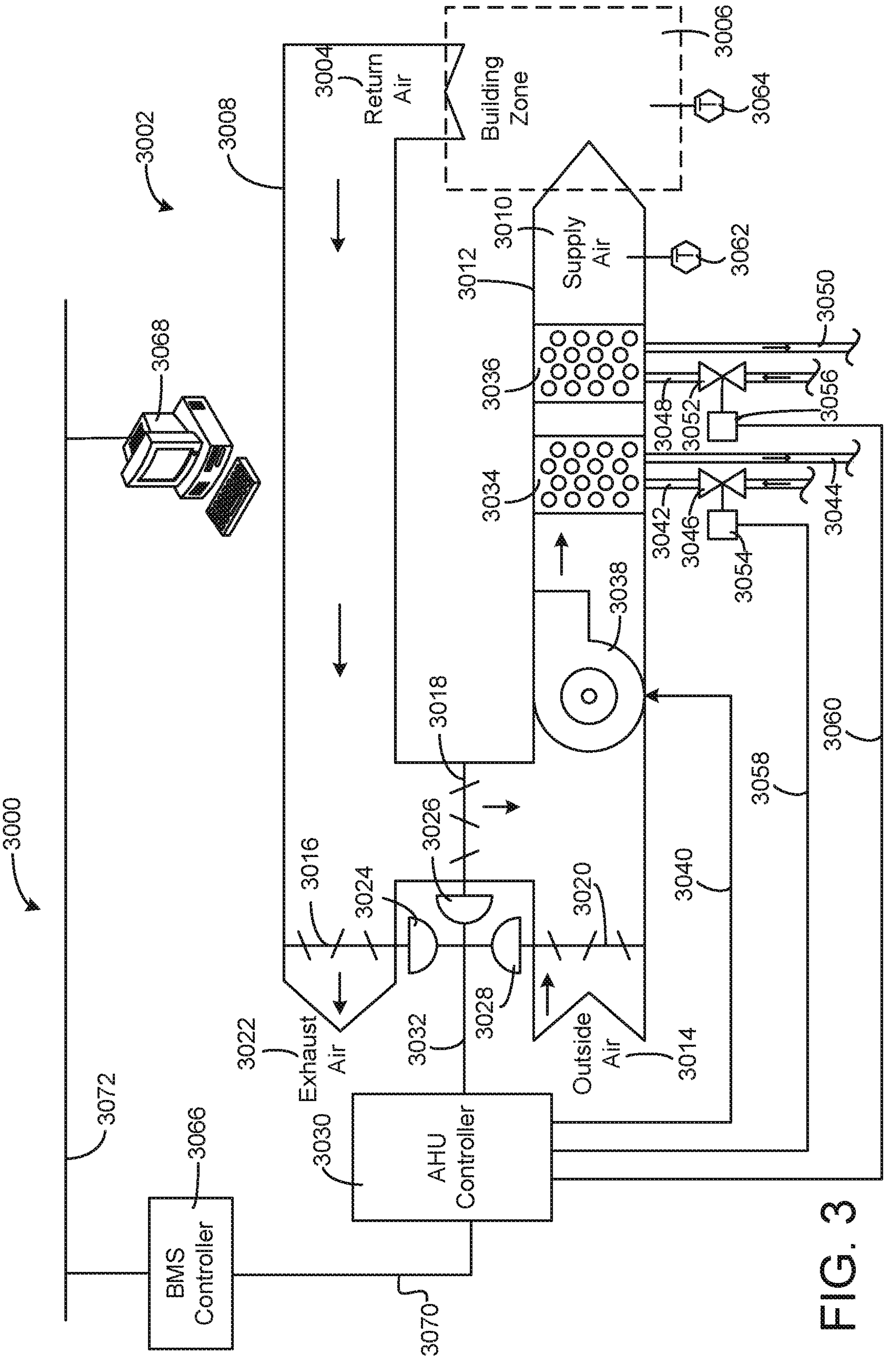
FIG. 3 is a block diagram of an airside system which can be used to serve the heating or cooling loads of the building of FIG. 1, according to some embodiments.
Figure 4:
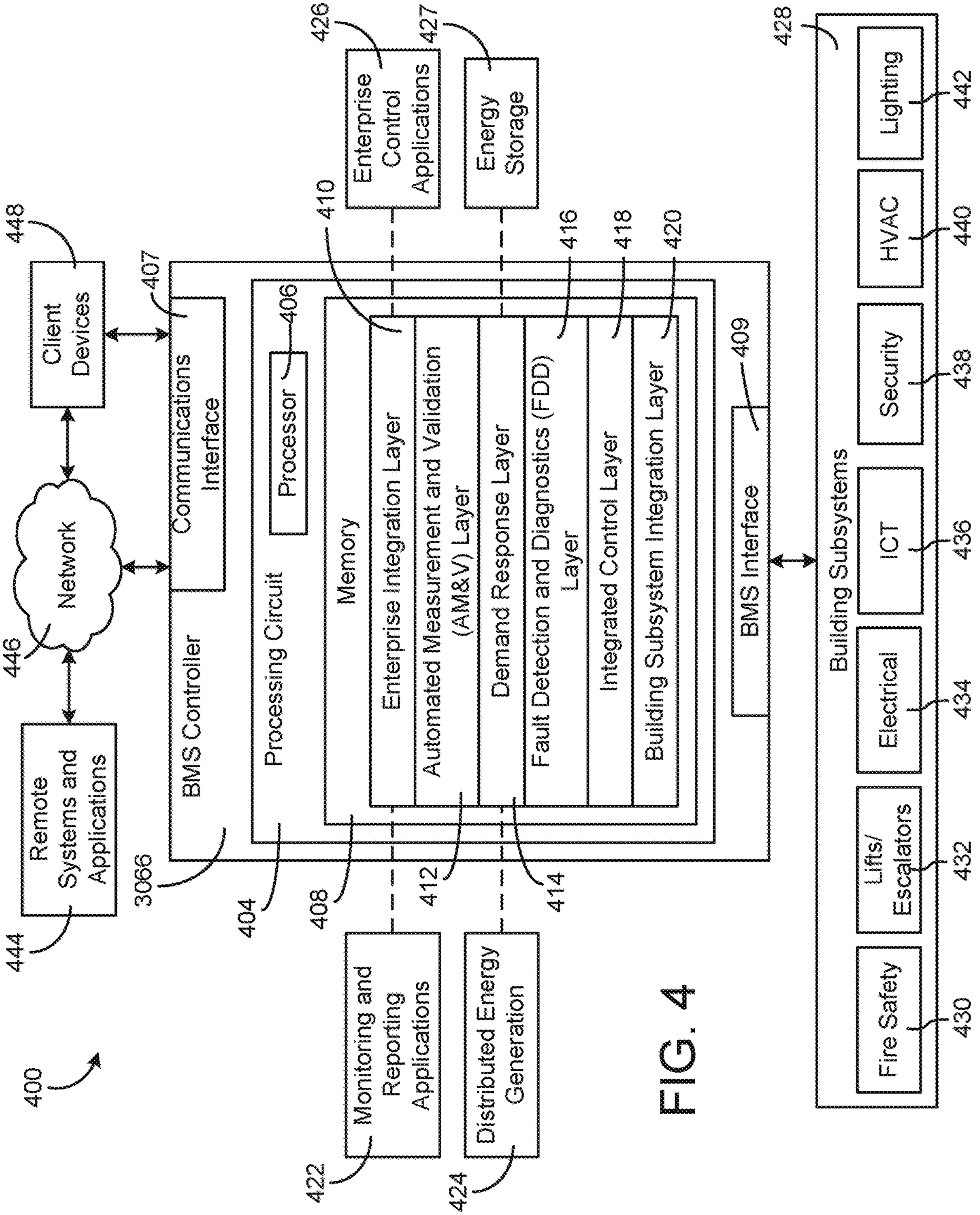
FIG. 4 is a block diagram of a building management system (BMS) which can be used to monitor and control the building of FIG. 1, according to some embodiments.
Figure 5:
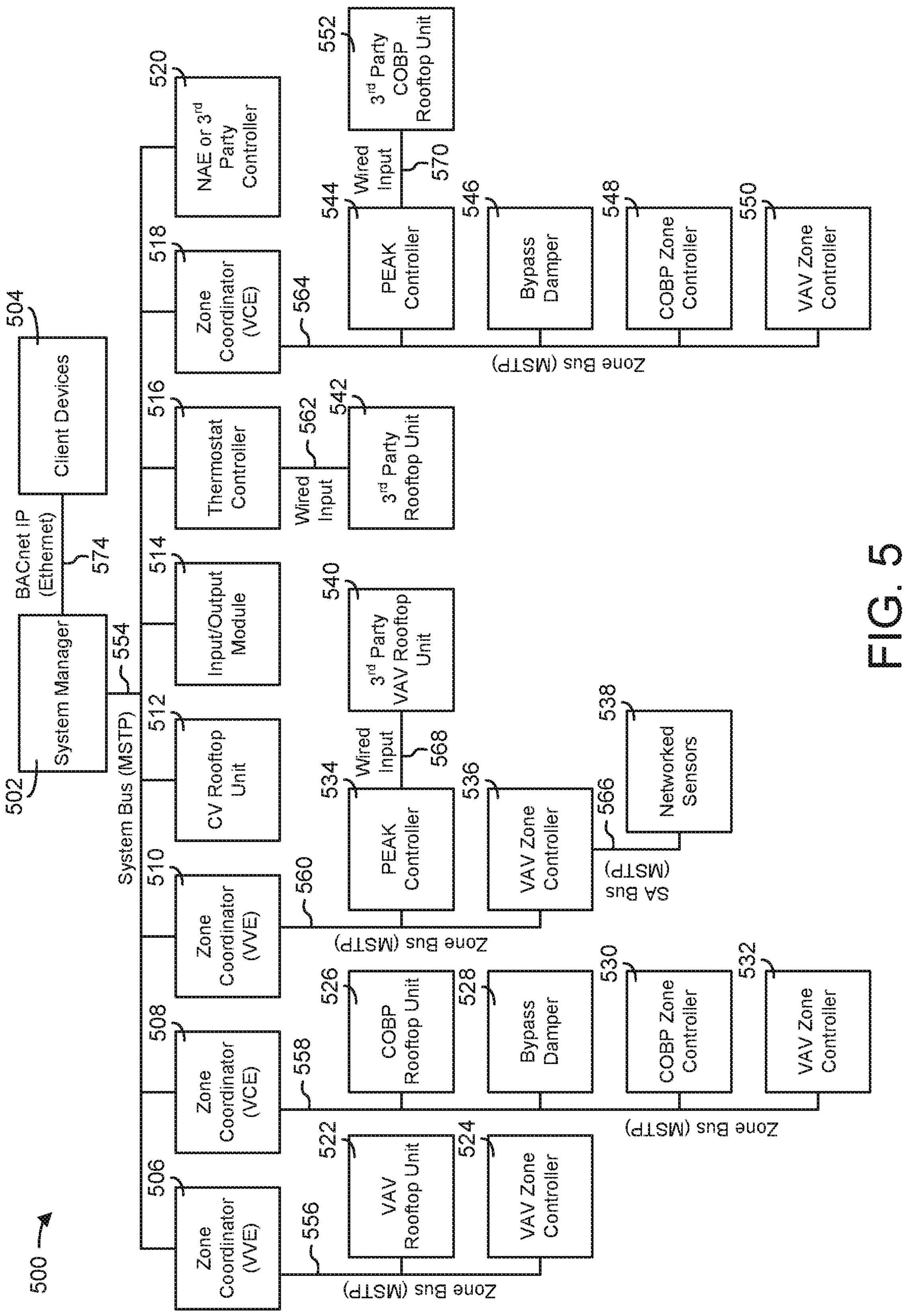
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 3000 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 3000 is shown, according to some embodiments. In various embodiments, airside system 3000 may supplement or replace airside system 130 in HVAC system 100 or can be implemented separate from HVAC system 100. When implemented in HVAC system 100, airside system 3000 can include a subset of the HVAC devices in HVAC system 100 (e.g., AHU 106, VAV units 116, ducts 112-114, fans, dampers, etc.) and can be located in or around building 10. Airside system 3000 may operate to heat or cool an airflow provided to building 10 using a heated or chilled fluid provided by waterside system 200.

In FIG. 3, airside system 3000 is shown to include an economizer-type air handling unit (AHU) 3002. Economizer-type AHUs vary the amount of outside air and return air used by the air handling unit for heating or cooling. For example, AHU 3002 may receive return air 3004 from building zone 3006 via return air duct 3008 and may deliver supply air 3010 to building zone 3006 via supply air duct 3012. In some embodiments, AHU 3002 is a rooftop unit located on the roof of building 10 (e.g., AHU 106 as shown in FIG. 1) or otherwise positioned to receive both return air 3004 and outside air 3014. AHU 3002 can be configured to operate exhaust air damper 3016, mixing damper 3018, and outside air damper 3020 to control an amount of outside air 3014 and return air 3004 that combine to form supply air 3010. Any return air 3004 that does not pass through mixing damper 3018 can be exhausted from AHU 3002 through exhaust damper 3016 as exhaust air 3022.

Each of dampers 3016-3020 can be operated by an actuator. For example, exhaust air damper 3016 can be operated by actuator 3024, mixing damper 3018 can be operated by actuator 3026, and outside air damper 3020 can be operated by actuator 3028. Actuators 3024-328 may communicate with an AHU controller 3030 via a communications link 3032. Actuators 3024-328 may receive control signals from AHU controller 3030 and may provide feedback signals to AHU controller 3030. Feedback signals can include, for example, an indication of a current actuator or damper position, an amount of torque or force exerted by the actuator, diagnostic information (e.g., results of diagnostic tests performed by actuators 3024-3028), status information, commissioning information, configuration settings, calibration data, and/or other types of information or data that can be collected, stored, or used by actuators 3024-3028. AHU controller 3030 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 3024-3028.

Still referring to FIG. 3, AHU 3002 is shown to include a cooling coil 3034, a heating coil 3036, and a fan 3038 positioned within supply air duct 3012. Fan 3038 can be configured to force supply air 3010 through cooling coil 3034 and/or heating coil 3036 and provide supply air 3010 to building zone 3006. AHU controller 3030 may communicate with fan 3038 via communications link 3040 to control a flow rate of supply air 3010. In some embodiments, AHU controller 3030 controls an amount of heating or cooling applied to supply air 3010 by modulating a speed of fan 3038.

Cooling coil 3034 may receive a chilled fluid from waterside system 200 (e.g., from cold water loop 216) via piping 3042 and may return the chilled fluid to waterside system 200 via piping 3044. Valve 3046 can be positioned along piping 3042 or piping 3044 to control a flow rate of the chilled fluid through cooling coil 3034. In some embodiments, cooling coil 3034 includes multiple stages of cooling coils that can be independently activated and deactivated (e.g., by AHU controller 3030, by BMS controller 3066, etc.) to modulate an amount of cooling applied to supply air 3010.

Heating coil 3036 may receive a heated fluid from waterside system 200 (e.g., from hot water loop 214) via piping 3048 and may return the heated fluid to waterside system 200 via piping 3050. Valve 3052 can be positioned along piping 3048 or piping 3050 to control a flow rate of the heated fluid through heating coil 3036. In some embodiments, heating coil 3036 includes multiple stages of heating coils that can be independently activated and deactivated (e.g., by AHU controller 3030, by BMS controller 3066, etc.) to modulate an amount of heating applied to supply air 3010.

Each of valves 3046 and 3052 can be controlled by an actuator. For example, valve 3046 can be controlled by actuator 3054 and valve 3052 can be controlled by actuator 3056. Actuators 3054-3506 may communicate with AHU controller 3030 via communications links 3058-3060. Actuators 3054-3056 may receive control signals from AHU controller 3030 and may provide feedback signals to controller 3030. In some embodiments, AHU controller 3030 receives a measurement of the supply air temperature from a temperature sensor 3062 positioned in supply air duct 3012 (e.g., downstream of cooling coil 3034 and/or heating coil 3036). AHU controller 3030 may also receive a measurement of the temperature of building zone 3006 from a temperature sensor 3064 located in building zone 3006.

In some embodiments, AHU controller 3030 operates valves 3046 and 3052 via actuators 3054-3056 to modulate an amount of heating or cooling provided to supply air 3010 (e.g., to achieve a setpoint temperature for supply air 3010 or to maintain the temperature of supply air 3010 within a setpoint temperature range). The positions of valves 3046 and 3052 affect the amount of heating or cooling provided to supply air 3010 by cooling coil 3034 or heating coil 3036 and may correlate with the amount of energy consumed to achieve a desired supply air temperature. AHU controller 3030 may control the temperature of supply air 3010 and/or building zone 3006 by activating or deactivating coils 3034-3036, adjusting a speed of fan 3038, or a combination of both.

Still referring to FIG. 3, airside system 3000 is shown to include a building management system (BMS) controller 3066 and a client device 3068. BMS controller 3066 can include one or more computer systems (e.g., servers, supervisory controllers, subsystem controllers, etc.) that serve as system level controllers, application or data servers, head nodes, or master controllers for airside system 3000, waterside system 200, HVAC system 100, and/or other controllable systems that serve building 10. BMS controller 3066 may communicate with multiple downstream building systems or subsystems (e.g., HVAC system 100, a security system, a lighting system, waterside system 200, etc.) via a communications link 3070 according to like or disparate protocols (e.g., LON, BACnet, etc.). In various embodiments, AHU controller 3030 and BMS controller 3066 can be separate (as shown in FIG. 3) or integrated. In an integrated implementation, AHU controller 3030 can be a software module configured for execution by a processor of BMS controller 3066.

In some embodiments, AHU controller 3030 receives information from BMS controller 3066 (e.g., commands, setpoints, operating boundaries, etc.) and provides information to BMS controller 3066 (e.g., temperature measurements, valve or actuator positions, operating statuses, diagnostics, etc.). For example, AHU controller 3030 may provide BMS controller 3066 with temperature measurements from temperature sensors 3062-3064, equipment on/off states, equipment operating capacities, and/or any other information that can be used by BMS controller 3066 to monitor or control a variable state or condition within building zone 3006.

Client device 3068 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 3068 can be a computer workstation, a client terminal, a remote or local interface, or any other type of user interface device. Client device 3068 can be a stationary terminal or a mobile device. For example, client device 3068 can be a desktop computer, a computer server with a user interface, a laptop computer, a tablet, a smartphone, a PDA, or any other type of mobile or non-mobile device. Client device 3068 may communicate with BMS controller 3066 and/or AHU controller 3030 via communications link 3072.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 3066 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 3000, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 3066 is shown to include a communications interface 407 and a BMS interface 409. Interface 407 may facilitate communications between BMS controller 3066 and external applications (e.g., monitoring and reporting applications 422, enterprise control applications 426, remote systems and applications 444, applications residing on client devices 448, etc.) for allowing user control, monitoring, and adjustment to BMS controller 3066 and/or subsystems 428. Interface 407 may also facilitate communications between BMS controller 3066 and client devices 448. BMS interface 409 may facilitate communications between BMS controller 3066 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 3066 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 3066 is implemented within a single computer (e.g., one server, one housing, etc.). In various other embodiments BMS controller 3066 can be distributed across multiple servers or computers (e.g., that can exist in distributed locations). Further, while FIG. 4 shows applications 422 and 426 as existing outside of BMS controller 3066, in some embodiments, applications 422 and 426 can be hosted within BMS controller 3066 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 3066. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 3066 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 3066 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 3000, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Chiller Assembly

Figure 6:
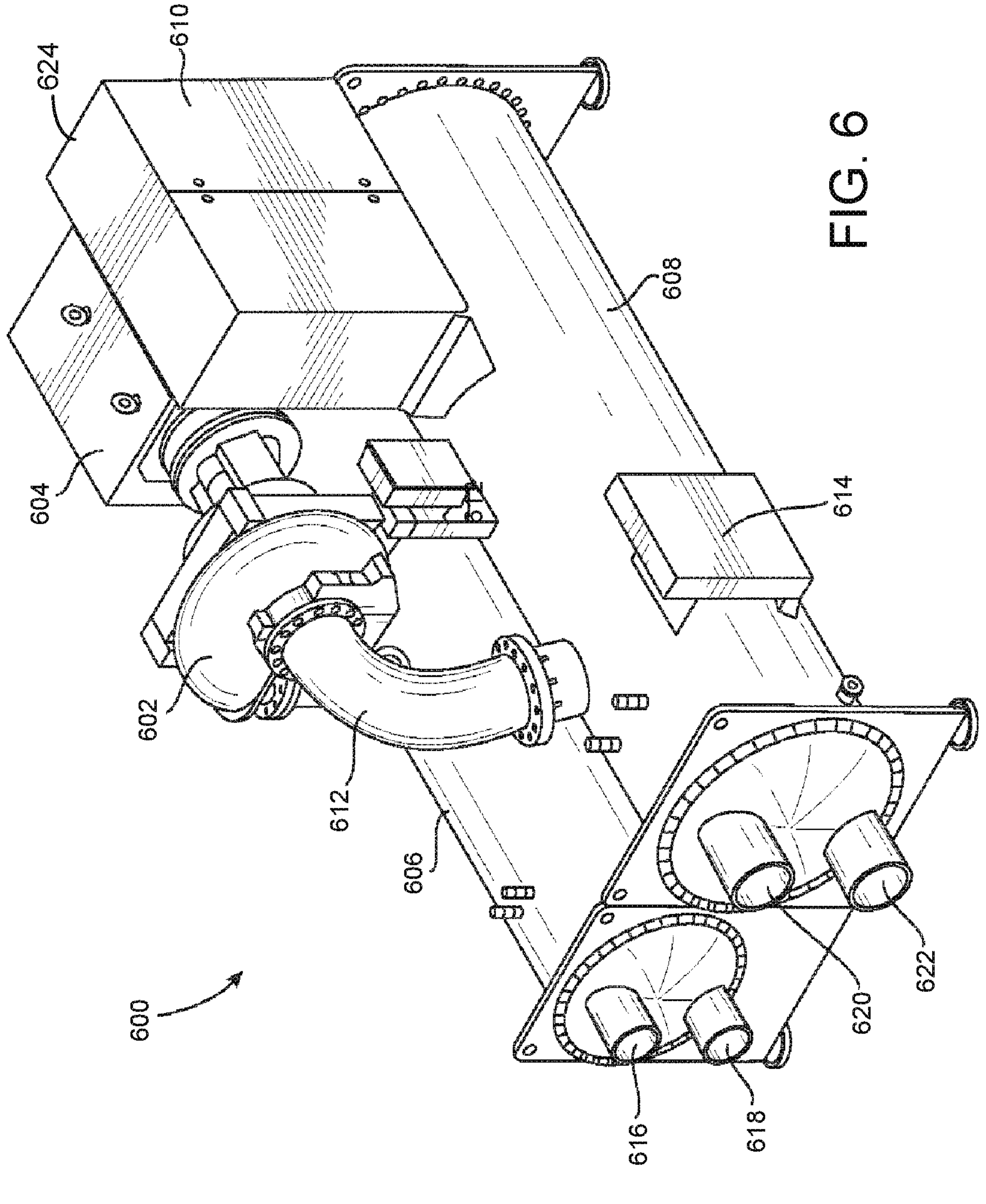
FIG. 6 is a drawing of a chiller assembly associated with the HVAC system of FIG. 1, according to some embodiments.

Turning now to FIG. 6, an example implementation of a chiller assembly 600 is shown, according to some embodiments. Chiller assembly 600 may be identical or similar to chiller 102 described above. Chiller assembly 600 is shown to include a compressor 602 driven by a motor 604, a condenser 606, and an evaporator 608. A refrigerant can be circulated through chiller assembly 600 in a vapor compression cycle or an absorption refrigeration cycle. The refrigerant can be a low pressure refrigerant with an operating pressure less than 400 kPa, for example. Chiller assembly 600 can also include a control panel 614 configured to control operation of the vapor compression cycle within chiller assembly 600. Control panel 614 may be connected to a variety of sensors (e.g., pressure sensors, temperature sensors) and an electronic network (e.g., network 446) in order to communicate a variety of data related to maintenance, analytics, performance, etc. The sensors may additionally or alternatively communicate directly with a controller (e.g., BMS controller 3066) and/or BMS 400.

Motor 604 can be powered by a variable speed drive (VSD) 610. In some embodiments, VSD 610 receives alternating current (AC) power having a fixed line voltage and fixed line frequency from an AC power source (not shown) and provides power having a variable voltage and frequency to motor 604. Motor 604 can be any type of electric motor that can be powered by VSD 610.

For example, motor 604 can be a high speed induction motor. Compressor 602 can be driven by motor 604 to compress a refrigerant vapor received from evaporator 608 through a suction line 612. For example, compressor 602 can include an impeller comprising a plurality of blades configured to rotate at a high speed in order to compress refrigerant vapor. Compressor 602 may then deliver compressed refrigerant vapor to condenser 606 through a discharge line. Compressor 602 can be a centrifugal compressor, a screw compressor, a scroll compressor, a turbine compressor, or any other type of suitable compressor.

Evaporator 608 can include an internal tube bundle (not shown), a supply line 620, and a return line 622 for supplying and removing a process fluid to the internal tube bundle. Supply line 620 and return line 622 can be in fluid communication with a component within an HVAC system (e.g., air handler 106) via conduits that circulate the process fluid. In some embodiments, the process fluid is a chilled liquid for cooling a building and can be, but is not limited to, water, ethylene glycol, calcium chloride brine, sodium chloride brine, or any other suitable liquid. Evaporator 608 can be configured to lower the temperature of the process fluid as the process fluid passes through the tube bundle of evaporator 608 and exchanges heat with the refrigerant. Refrigerant vapor is formed in evaporator 608 by the refrigerant liquid delivered to the evaporator 608 exchanging heat with the process fluid and undergoing a phase change to refrigerant vapor.

Refrigerant vapor delivered by compressor 602 to condenser 606 transfers heat to a fluid. Refrigerant vapor condenses to refrigerant liquid in condenser 606 as a result of heat transfer with the fluid. The refrigerant liquid from condenser 606 can flow through an expansion device and be returned to evaporator 608 to complete the refrigerant cycle of the chiller assembly 600. Condenser 606 includes a supply line 616 and a return line 618 for circulating fluid between the condenser 606 and an external component of the HVAC system (e.g., a cooling tower). Fluid supplied to condenser 606 via return line 618 can exchange heat with the refrigerant in condenser 606 and can be removed from the condenser 606 via supply line 616 to complete the cycle. The fluid circulating through the condenser 606 can be water or any other suitable liquid.

In some embodiments, chiller assembly 600 illustrates an example building device that can be monitored for vibrational data. Sensors can be mounted to an external casing of chiller assembly 600. Specifically, sensors may be mounted at bearing locations across a drive line of chiller assembly 600. In this case, the bearing locations may be locations of chiller assembly 600 that experience transfer of forces to the external casing of chiller assembly 600. Sensors can be mounted to measure three-dimensional vibrational data of chiller assembly 600. In other words, the sensors can measure how chiller assembly 600 and/or associated components vibrate in three-dimensional space. Purely for sake of example, sensors for measuring vibrational data may be mounted at locations of chiller assembly 600 such as motor 604, VSD 610, compressor 602, suction line 612, etc. In this way, vibrational data can be collected across various locations of chiller assembly 600. Various other measurable characteristics of equipment operation may be measured by sensors included in the chiller assembly 600 or other equipment unit, according to various embodiments within the scope of the present disclosure.

Figure 7:
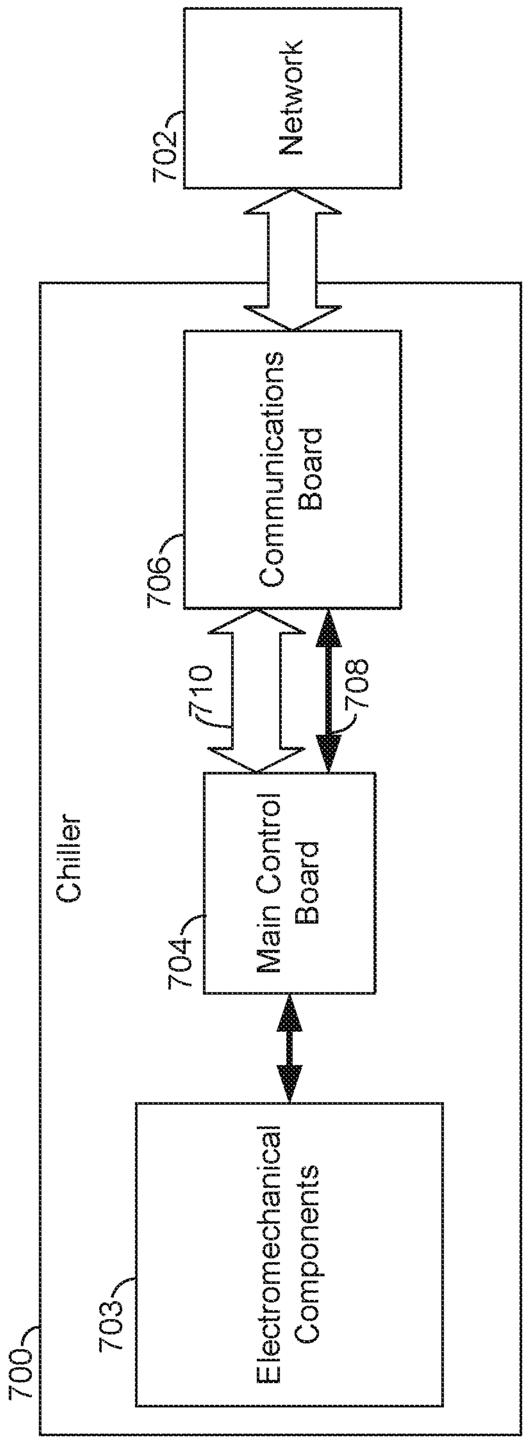
FIG. 7 is a block diagram of a chiller, according to some embodiments.

The chiller assembly 600 includes a housing and circuitry for controlling the various refrigeration components described above, the circuitry positioned in the housing with the refrigeration components of the chiller (e.g., the compressor 602, the VSD 610, motor 604, etc.). As shown in FIG. 7 and described in further detail below, such components can include a chiller control board and a communications board, both of which can be positioned within the housing of the chiller assembly 600 shown in FIG. 6 (e.g., proximate the VSD 610). Multiple communications channels between the chiller control board and the communications board can also be provided within the chiller assembly 600 (e.g., inside the housing), for example via an ethernet cable and Modbus cable (or other set of different cabling or wiring that provides different bandwidths or types of data transfer).

In some embodiments, such circuitry of the chiller assembly 600 includes an antenna for receiving and transmitting signals to enable wireless communications, for example via a Wi-Fi or cellular network. In some embodiments, the housing of the chiller assembly 600 includes a panel or window (e.g., panel 624) made of a transmissive material which enables transmission of such signals to cross through the panel or window to and from the antenna. Other elements of the housing and other components, structures, etc. of the chiller assembly 600 may be primarily metal, such that wireless signals may be blocked by such other portions of the chiller assembly 600. By providing the panel 624 (or other portion of the housing of the chiller assembly 600) as a section of a different, transmissive materials (e.g., plastic, polymer, organic material, etc.) through which electromagnetics waves having a suitable frequency for wireless communications can be easily transmitted (e.g., radio-frequency), the antenna is able to be located inside the chiller assembly 600. Such an arrangement can reduce installation time, protect the antenna from damage, reduce installation errors, etc. in various embodiments. In other embodiments, the panel 624 serves as an antenna and/or is integrated within an antenna to enable transmission of wireless signals to and from the chiller assembly 600. In other embodiments, the housing is provided with a port through which a cable can connect from an antenna located external to the housing to the communications board located internal to the circuitry of the chiller assembly 600. Various such embodiments are within the scope of the present disclosure.

Embedded Connectivity

Referring now to FIG. 7, a block diagram of a chiller 700 connected to a network 702 is shown, according to some embodiments. The chiller 700 may be the same as or similar to chiller 600, or may be a chiller of a different type or design. In alternative embodiments, the teachings herein are implemented for equipment other than a chiller including the various different equipment and systems described above with reference to FIGS. 1-5 (e.g., air handling unit, rooftop unit, cooling tower, boiler, variable air volume box, variable refrigerant flow system, etc.).

As shown in FIG. 7, the chiller 700 includes electromechanical components 703 configured to operate to chill a fluid (e.g., a compressor, motor, variable speed drive, refrigeration cycle components, etc. as described with respect to the chiller 600 in FIG. 6 or otherwise include in various different types of chillers), a main control board 704, and a communications board 706.

The main control board 704 is configured to control the electromechanical components 703, for example by provided control signals which cause particular operations of the electromechanical components 703 in accordance with the control signals. In some embodiments, the electromechanical components 703 include additional circuitry associated with particular devices (e.g., circuitry of the motor, of the variable speed drive, of an actuator, etc.) and adapted to implement such control signals within the electromechanical components 703. The main control board 704 may receive measurements or other feedback from the electromechanical components (e.g., sensor measurements, digital or analog signals from sensors) and provide a feedback control loop to adjust control signals provided to the electromechanical components 703 based on such feedback. For example, the main control board 704 may control the electromechanical components 703 based on a setpoint for a supply water temperature as output from the chiller 700 as compared to measurements of said water temperature. The main control board 704 controls operation of the chiller 700 in serving cooling loads (i.e., in generating a chilled fluid). Various simple wired connections (e.g., analog wiring) can be provided between the main control board 704 and various electromechanical components 703 to facilitate transfer of signals therebetween.

The communications board 706 is configured to enable communications between the chiller 700 and the network 702, which may be an information technology (IT) network such as the Internet, etc. The communications board 706 can include elements enabling selection between one or more wired (e.g., ethernet) and one or more wireless (e.g., Wi-Fi, cellular) communications modalities for establishing communications between the communications board 706 and the network 702, thereby providing flexible deployment options for the chiller 700. The communications board 706 may also be configured to enable communications between the chiller 700 and other building equipment, supervisory controllers, sensors, etc. via a building network (e.g., a network using BACnet, Modbus, etc. communications). Various features of the communications board 706 are described in further detail below, for example with reference to FIGS. 8-9.

As shown in FIG. 7, multiple communications channels are provided between the main control board 704 and the communications board 706, shown as a first communications channel 708 and a second communications channel 710. As illustrated, the first communications channel 708 and the second communications channel 710 are different types of communications channels, for example communications channels providing for different bandwidths of communications such that the second communications channel 710 provides higher bandwidth, higher speed, etc. communications between the communications board 706 and the main control board 704 as compared to the first communications channel 708. In some embodiments, the first communications channel 708 is provided via a Modbus cable or cabling suitable for other building communications protocols and the first communications channel 708 provides communications using a building equipment communications protocol (e.g., Modbus, BACnet), while the second communications channel 710 is provided via an ethernet or USB cable or connection suitable for providing higher bandwidth communications (e.g., via IT protocols).

The first communications channel 708 and the second communications channel 710 can be used for communicating different types of information and enabling different interoperability between the main control board 704 and the communications board 706. For example, the first communications channel 708 may be used for communicating data points (e.g., measurements, operating points, setpoints, etc.) to and from the main control board 704 in a native data protocol which is conventionally used for such points in building automation systems, enabling simple integrations and implementations without requiring translation to a different protocol or data format for communication through a different type of communications channel (e.g., through second communications channel 710). The second communications channel 710 can be used for other functions, for example for enabling over-the-air software updates for the main control board 704 to be installed via the communications board 706 and the second communications channel 710 (an operation which may not be feasible via the first communications channel 708, in some embodiments) or enabling high-speed access to information about the main control board 704 via a user interface provided with the chiller 700. Various functionalities enabled by the combination of the first communications channel 708 and the second communications channel 710 are contemplated by the present disclosure.

Figure 8:
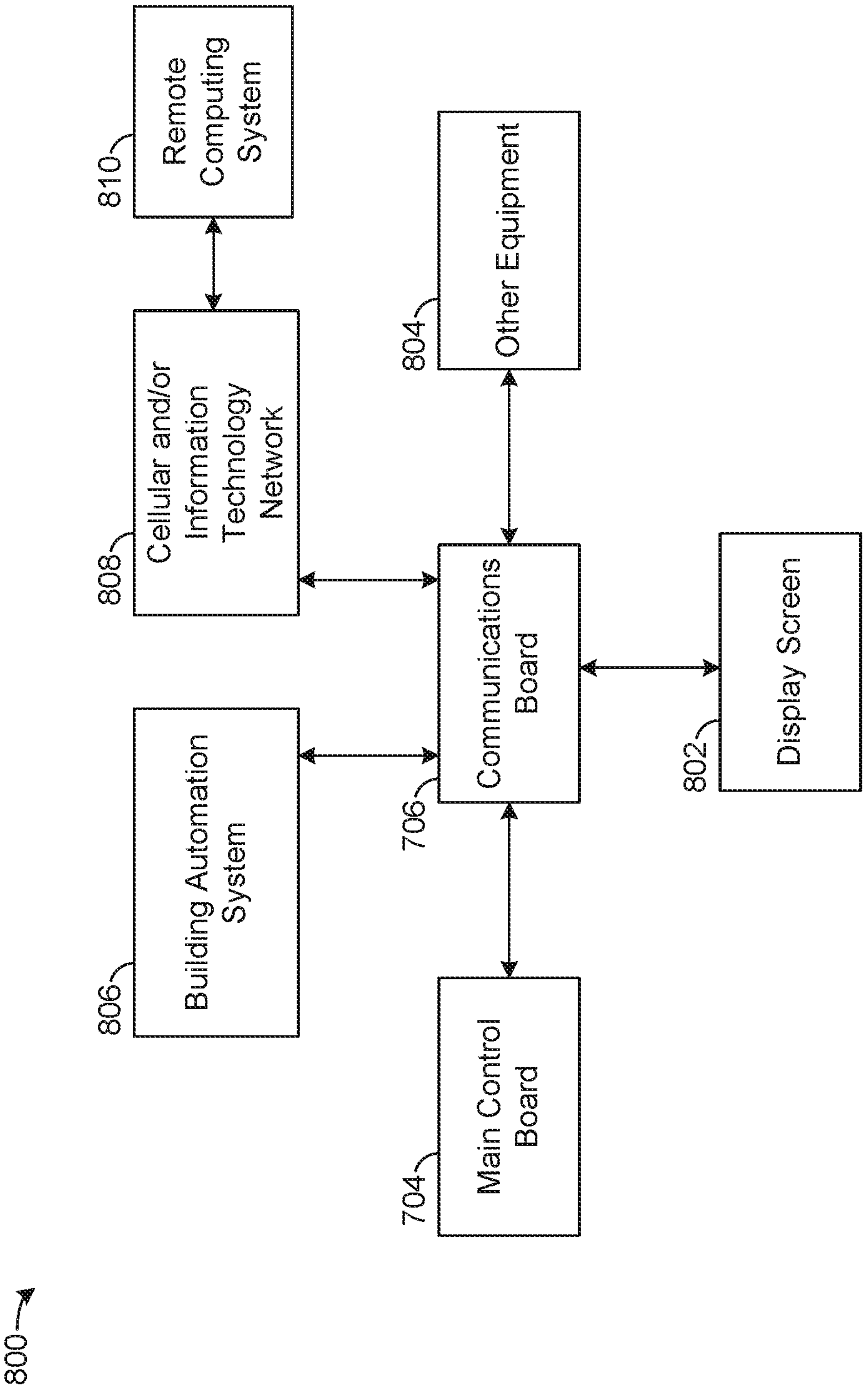
FIG. 8 is a block diagram of a system relating to the chiller of FIG. 7, according to some embodiments.

Referring now to FIG. 8, a block diagram of a system 800 including the communications board 706 is shown, according to some embodiments. FIG. 8 illustrates various systems, equipment, devices, etc. which can be in communication with the chiller 700 via the communications board 706, for example to provide interoperability with the main control board 704 according to various embodiments.

As shown in FIG. 8, the system 800 includes a display screen 802 in communication with the communications board 706. The display screen 802 be an element of the chiller 700 (e.g., coupled to a housing of the chiller 700, visible on the chiller assembly 600 from viewpoint of FIG. 6, etc.), or can be a separate device (e.g., a personal computing device, smartphone, tablet, head-mounted display, etc.). The display screen 802 can be configured to display various content relating to operation of the chiller 700, for example in a graphical user interface generated by the communications board 706, and can include elements to receive inputs to interact with the graphical user interface (e.g., may be configured as a touchscreen). The graphical user interface presented at the display screen 802 can include data from or enable interactions with the main control board 704 via the communications board 706, for example via the first communications channel 708 and/or the second communications channel 710 shown in FIG. 7 and described above.

FIG. 8 also shows the system 800 as including other equipment 804. Other equipment 804 can include other building equipment, for example other chillers in a chiller plant including the chiller 700 and/or other equipment such as an air handling unit which receives a chilled fluid from the chiller 700. As illustrated, the communications board 706 can include direct communications between the chiller 700 and the other equipment 804, for example via BACnet, Modbus, Zigbee, or other communication modality. In some embodiments, the communications board 706 facilitates coordination of operation of the chiller 700 and the other equipment 804 via said direction communications between the chiller 700 and the other equipment 804 and/or facilitates routing of data from the other equipment 804 to other elements of the system 800 and vice versa.

The system 800 is also shown as including a building management system 806. The building management system 806 may be configured according to the teachings of FIGS. 1-5 described above (e.g., may be the same as or similar to the BMS 500). The communications board 706 can communicate with the building management system 806 via different communications modalities in various embodiments, including a building communications protocol (Modbus, BACnet, etc.) or IT protocol as may be suitable depending upon configuration of the building management system 806. The communications board 706 can be configured to be flexibly connected to the building management system 806 via the suitable modality in the field (e.g., upon installation at the building), so as to enable easy installation of the chiller 700 at different building served by different types of building management systems 806 without reconfiguration in manufacturing and production of the communications board 706. The building management system 806 may receive and use data relating to operations of the chiller 700 from the communications board 706 and provide control decisions and/or other operational instructions for the chiller 700 to the communications board 706.

FIG. 8 further illustrates the system 800 as including a cellular and/or information technology network 808 enabling communications between the communications board 706 and a remote computing system 810. The network 808 may be the network 702 of FIG. 7. The remote computing system 810 can be any computing system remote (located away) from the chiller 700, e.g., located off-premise of a building served by the chiller 700, for example a cloud computing system. The remote computing system 810 can provide various smart building features, enterprise management features, data storage, etc. associated with operation of the chiller 700. In some embodiments, the remote computing system 810 provides fault detection, fault prediction, predictive optimization, supervisory control, or various other operations relating to operation of the chiller 700. In some embodiments, the remote computing system 810 determines control settings or logic to be executed by the main control board 704 and provides such control settings or logic to the communications board 706 for deployment on the main control board 704. Various such interoperability is enabled by the system 800 of FIG. 8 in combination with various other features herein.

Figure 9:
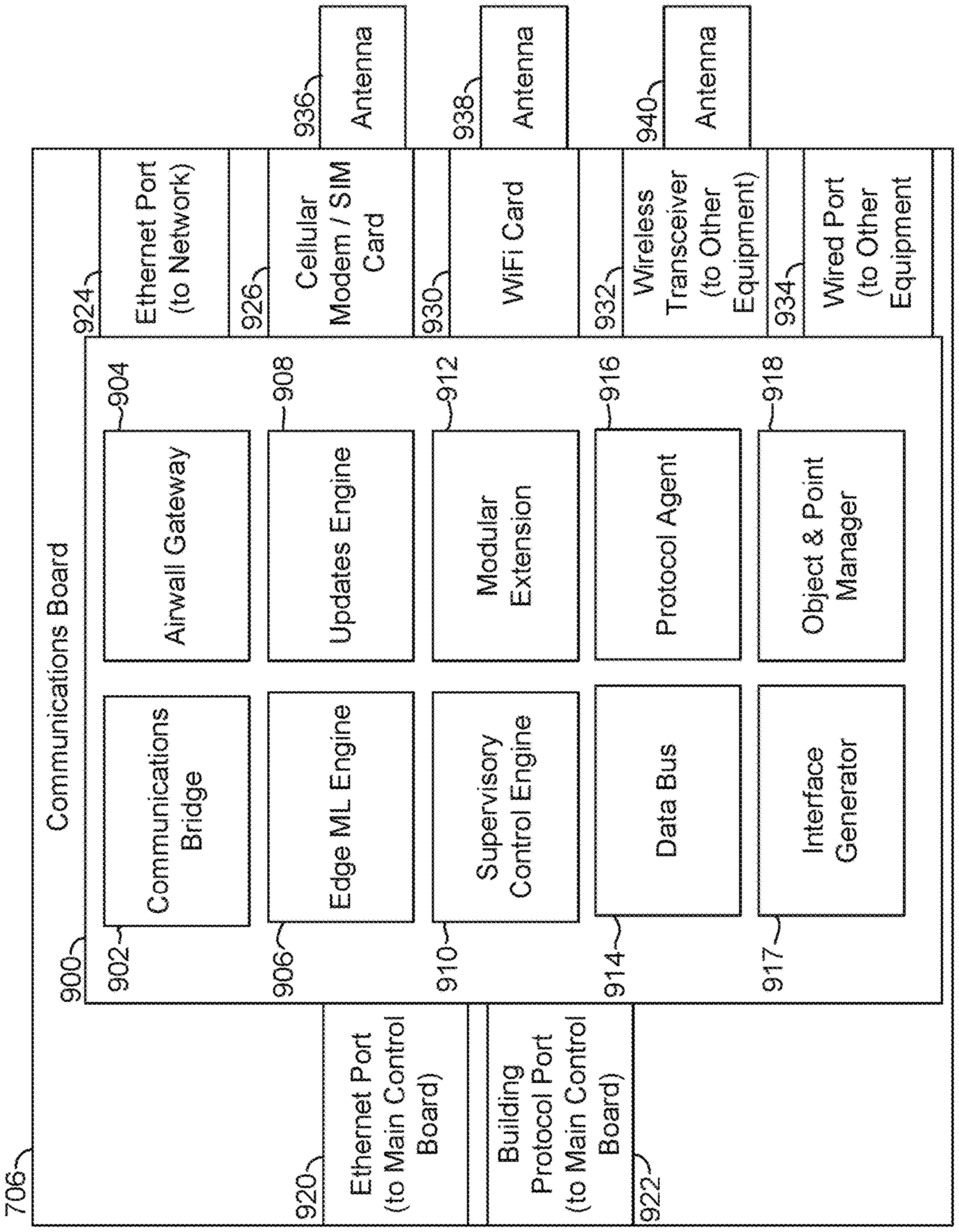
FIG. 9 is a block diagram of a communications board of the chiller of FIG. 7, according to some embodiments.

Referring now to FIG. 9, a block diagram of the communications board 706 is shown, according to some embodiments. As shown in FIG. 9, the communications board 706 includes processing circuitry 900, for example implemented using one or more computer memory devices and one or more processors, which provides a communications bridge 902, an airwall gateway 904, an edge machine learning (ML) engine 906, an updates engine 908, a supervisory control engine 910, a modular extension 912, a data bus 914, a protocol agent 916, an interface generator 917, and an object and point manager 918. The communications board 706 is also shown as including an ethernet port 920 for communications to the main control board 704 via the second communications channel 710, a building protocol port 922 for communications to the main control board 704 via the first communications channel 708, an ethernet port 924 for communication with the network 702 (or network 808), a cellular modem and/or SIM card 926 for communication with the network 702 (or network 808), a Wi-Fi card 930 for communication with the network 702 (or network 808), wireless transceiver 932 for communication with other equipment 804 (e.g., via Zigbee), and a wired port 934 for communication with other equipment 804. FIG. 9 further shows, coupled to or as elements of the communications board 706, a first antenna 936 to facilitate cellular communications, a second antenna 938 to facilitate Wi-Fi communications, and third antenna 940 to facilitate wireless equipment communications (e.g., Zigbee). In some embodiments, some or all of the ethernet ports shown in FIG. 9 are instead implemented as USB ports. Various embodiments including any combination or sub combination of the components shown in FIG. 9 are within the scope of the present disclosure.

The communications bridge 902 is configured to provided data handling and management to facilitate communications between the communications board 706 and the remote computing system 810. For example, the communications bridge 902 can ingest data into a digital twin of the chiller 700 and/or of a building serviced by the chiller 700 and use the digital twin information to facilitate connect of such data to appropriate destinations in the remote computing system 810. In some embodiments, the communications bridge 902 provides features of Open Blue Bridge by Johnson Controls. In some embodiments, the communications bridge 902 is configured according to the teachings of PCT Application No. PCT/US2022/054323 filed Dec. 30, 2022, the entire disclosure of which is incorporated by reference herein.

The airwall gateway 904 is configured to facilitate the security of network communications between the communications board 706 and the remote computing system 810 or other destination on the network 808 or network 702. The airwall gateway can be an endpoint in a zero trust overlay network, for example. The airwall gateway can provide communications across an air-gapped communication channel for example as described in for example as described in U.S. Pat. No. 10,038,725 granted Jul. 31, 2018, U.S. Pat. No. 10,178,133 granted Jan. 8, 2019, U.S. Pat. No. 9,621,514 granted Apr. 11, 2017, U.S. Pat. No. 10,797,993 granted Oct. 6, 2020, U.S. Pat. No. 10,911,418 granted Feb. 2, 2021, or U.S. Pat. No. 10,999,154 granted May 4, 2021, the entire disclosures of which are incorporated by reference herein.

The edge ML engine 906 is configured to provide at least one artificial intelligence operation which executes locally on the communications board 706. The at least one artificial intelligence operation can use a machine learning model, for example a model trained remotely from the communications board (e.g., in the remote computing system 810) and then converted into a hardware-specific format suitable for execution by the edge ML engine 906 at the edge (i.e., on the communications board 706) and provided to the communications board 706. The edge ML engine 906 can provide fault detection, fault prediction, predictive control, autoconfiguration, real-time dataflow processing, and various other features in various embodiments. In some embodiments, the edge ML engine 906 is configured according to the teachings as described in U.S. Patent Publication No. 2020/0327371, filed Apr. 9, 2019, U.S. Pat. No. 10,977,0101, filed Apr. 21, 2020, and/or U.S. Pat. Nos. 10,127,022, 11,272,011, filed May 19, 2021, filed Mar. 23, 2017, the entire disclosures of which are incorporated by reference herein.

The updates engine 908 is configured to facilitate over-the-air updates of the main control board 704, such that updates provided by the remote computing system 810 can be installed on the main control board 704. The updates can be software and/or firmware updates that may be associated with changing control logic executed by the main control board 704, improving efficiency of the chiller 700, improving life span of the chiller 700, improving cybersecurity of the main control board 704, etc. The updates engine 908 is configured to receive a software package from the remote computing system 701 via the network 808 and the ethernet port 924, determine that the software package is for installation on the main control board, and install the software package on the main control board 704 (e.g., via the second communications channel 710 and the ethernet port 920). In some embodiments, the updates engine 908 can identify code to be deleted from, uninstalled from, etc. the main control board 704 to be replaced by the updates reflected in the software package, and can cause such removal of existing programming from the main control board 704. In some embodiments, the updates engine 908 is configured to monitor operations of the chiller 700 (e.g., via data from the main control board 704) in order to execute installation of the updates at a suitable time, for example when the chiller 700 is an off state, such that the updates engine 908 can update the main control board 704 without disrupting the chiller's operations in serving a cooling load.

The supervisory control engine 910 is configured to provide supervisory control of the chiller 700 (via the main control board 704) and/or the other equipment 804. In some embodiments, the supervisory control engine 910 executes an algorithm, for example a predictive control algorithm and/or optimization process, configured to determine amounts of cooling to be provided by the chiller 700 at upcoming timesteps or to determine other control decisions or settings for use by the main control board 704. The communications board 706 may have more computing resources (e.g., processing power, memory, etc.) than the main control board 704, for example such that the algorithm executed by the supervisory control engine 910 is executable on the communications board 706 but would not be executable by the main control board 704.

The modular extension 912 is configured to accept, in a modular fashion, any extension to functionality of the communications board 706. The modular extension 912 can include a programming interface, data handling functions, etc. for efficiently accepting modular (e.g., dockerized) extensions that provide additional analytical, control, data processing, security, or other functionality to the communications board 706 as may be desirable for various use cases and implementations. Inclusion of the modular extension 912 illustrates the adaptability and flexibility of the architecture disclosed herein.

The data bus 914 is configured to receive, hold, and provide data for consumption by and communication to and from the various other elements described herein. In some embodiments, the data bus 914 is implemented as a broker according to the teachings of U.S. Provisional Patent Application No. 63/537,993 filed Sep. 12, 2023, the entire disclosure of which is incorporated by reference herein.

The protocol agent 916 is configured to manage the various building network protocols and information technology protocols used by the various modes of communication to and from the communications board 706. For example, the protocol agent 916 can automatically detect the protocol used by an incoming message and/or by a destination for an outgoing message. The protocol agent 916 can then provide automated translations between protocols so as to the enable the various communications paths described herein.

The interface generator 917 is configured to generate a graphical user interface for display on the display screen 802. The interface generator 917 can collect data from the main control board 704, from the remote computing system 810, and from the various internal operations and functions of the communications board 706 (e.g., via data bus 914) for inclusion together in a graphical user interface. The interface generator 917 can provide the display screen 802 with substantially real-time data, which may not otherwise be available without the higher-speed (e.g., ethernet) communications channel between the main control board 704 and the communications board 706. In some embodiments, the interface generator 917 is also configured to process user inputs received via the display screen 802 or other user input device and provide such user inputs to appropriate elements of the communications board 706, for example the supervisory control engine 910 to affect control and operations of the chiller 700.

The object & point manager 918 is configured to manage the various points (e.g., measurements, settings, on/off decisions, etc.) being processed or otherwise handled by the communications board 706 as well as data objects (e.g., equipment objects) associated with the chiller 700 and/or the other equipment 804. The object & point manager 918 can provide sorting, normalization, or other processing of incoming and outgoing data such that raw values are associated with their corresponding points and objects. The object & point manager 918 can thereby provide various functions which enable handling and labeling of data in the communications board 706, i.e., onboard the chiller 700.

Various combinations (and omissions) of the features described above as features of the communications board 706 are within the scope of the present disclosure. The communications board 706 can thus be provided as having the functionality as may be desirable for different implementations of the teachings herein.

Figure 10:
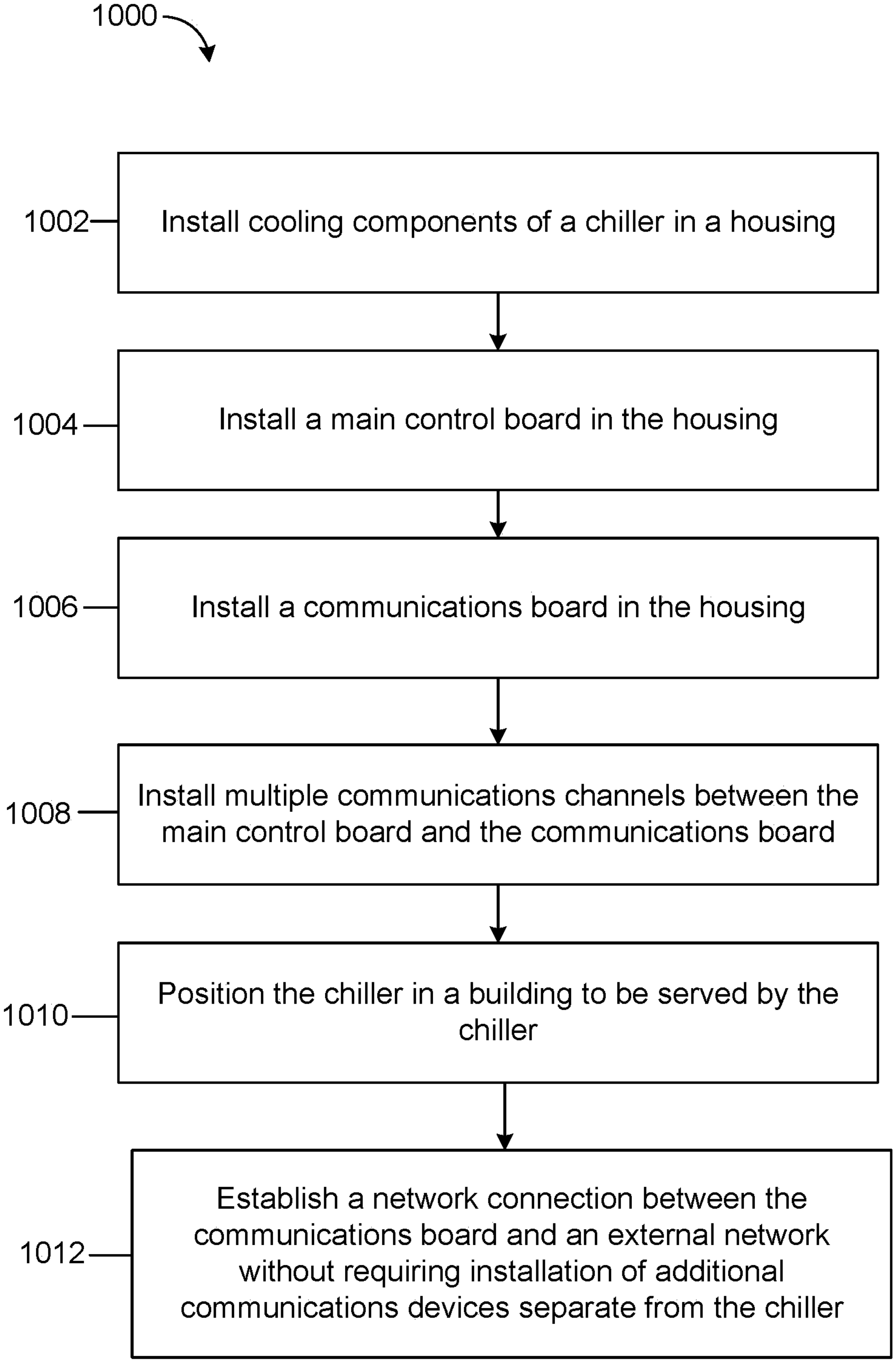
FIG. 10 is a flowchart of process for providing a chiller, according to some embodiments.

Referring now to FIG. 10, a process 1000 for deploying a chiller (e.g., chiller 700) at a building is shown, according to some embodiments.

At step 1002, cooling components of a chiller are installed in a hosing. Step 1002 can include physically manufacturing a chiller, for example assembling the chiller assembly 600 shown in FIG. 6.

At step 1004, a main control board (e.g., main control board 704) is installed in the housing. Step 1004 can include coupling the main control board to a structure inside the housing and wiring the main control board to various cooling components of the chiller (e.g., a variable speed drive, actuator, motor, valve, compressor, etc.) such that the main control board is arranged to provide control of such components. Step 1004 can also include wiring the main control board to a power source of the chiller (e.g., an electrical power input which provides electricity for operation of the cooling components of the chiller and the main control board).

At step 1006, a communications board (e.g., communications board 706) is installed in the housing. Step 1006 can include coupling the communications board to another structure inside the housing. Step 1006 can also include wiring the communications board to the power source of the chiller, such that the communications board 706 is provided with a power source during manufacturing.

At step 1008, multiple communications channels are installed between the main control board and the communications board. For example, a first, lower-bandwidth connection can be installed using a first type of cable or wiring (e.g., Modbus cable) and a second, higher-bandwidth connection can be installed using a second type of cable or wiring (e.g., USB, Ethernet). Cables connect the communication board and the main control board can be positioned in the housing as part of step 1008. Various other steps to complete manufacturing can also be completed as part of process 1000.

At step 1010, the chiller is positioned in a building to be served by the chiller. Step 1010 can include transporting the chiller from a manufacturing site to a building site, with the communications board already installed therein as per step 1008. Step 1010 can also include connecting the chiller to a power source (e.g., a building electrical system) and coupling the chiller to various piping, etc. for flow of chilled fluid generated by the chiller. The chiller can thus be physically installed in the building in step 1010.

At step 1012, a network connection is established between the communications board of the chiller and an external network without requiring installation of additional communications devices separate from the chiller. The network connection can be established by connected an ethernet cable (or other type of cabling) from the communications board of the chiller to existing IT infrastructure of the building. The network connection can be established by connecting the chiller to a Wi-Fi network of the building. The network connection can be established by connecting the chiller to a cellular network available at the building (e.g., a 5G network provided specifically in the building; an available cellular network provided in a region of the building for example by a telecom provider). Step 1012 can include selectively providing options for any such communications means, as may be suitable given the existing building infrastructure, wireless network availability at a location of the chiller, etc. Advantageously, because the communications board is already included in the chiller as manufactured, step 1012 does not include any adding any internal wiring of the chiller, interaction with the main control board, etc. which may otherwise require detailed domain expertise of an installation technician and consume substantial time and resources (e.g., additional devices, etc.) during installation. The teachings herein thereby provide ease of installation for chillers or other equipment adapted according to the teachings herein.

Figure 11:
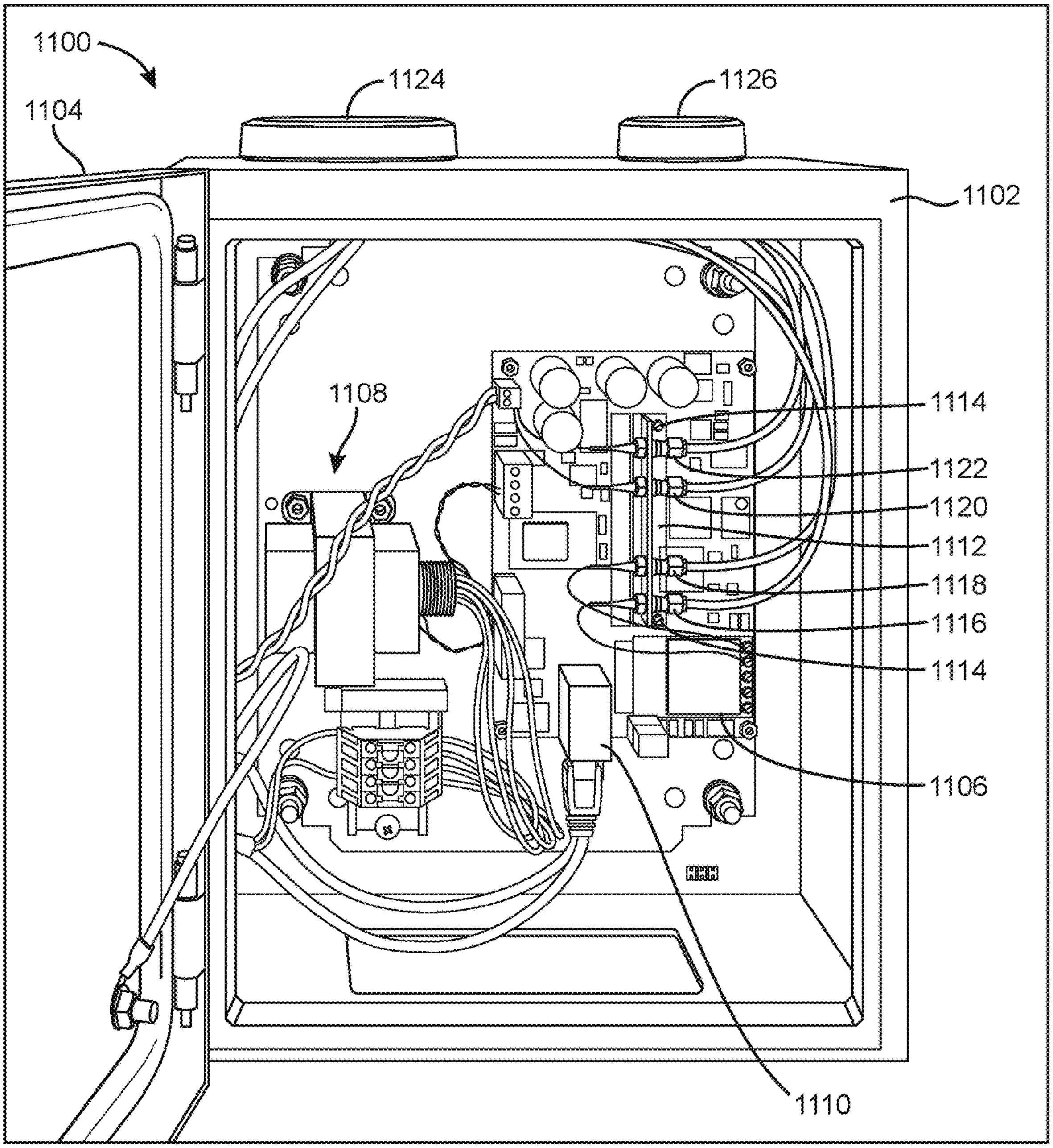
FIG. 11 is an illustration of a control panel for a chiller, according to some embodiments.

Referring now to FIG. 11, an illustration of a control panel 1100 (e.g., control panel 614) of a unit of building equipment such as a chiller (e.g., chiller 600) is shown, according to some embodiments. The control panel 1100 is shown as including a housing 1102 that includes a door 1104, with the door 1104 shown as open to provide access to an interior of the housing 1102. The door 1104 can be closed and latched to cause the housing 1102 to define a closed, interior volume.

As shown in FIG. 11, a circuit board 1106 is positioned in the housing 1102. The circuit board 1106 is shown as being coupled to a back wall of the housing 1102 and/or on a mounting plate, heat spreader, or other structure provided in the housing 1102. In some embodiments, the circuit board 1106 is the communications board 706 described above. The circuit board 1106 is also shown as including additional circuitry 1108 which can correspond to the main control board 704 and/or other electronics, power sources, components, etc. as may be appropriate for operations of a chiller or other type of equipment in various embodiments.

The circuit board 1106 is shown as including various processing, power, and memory components (e.g., adapted for performing the functions of the communications board 706 as described herein), as well as various ports and pins (e.g., ethernet port 1110) for providing signals onto and off of the circuit board 1106. The circuit board 1106 includes a physical board structure that includes mounting infrastructure for coupling of such components to the circuit board 1106. For example, the circuit board 1106 can include various mounting points (e.g., screw holes, peg holes, receptacles, slots, etc.) configured to receive one or more fasteners to provide for coupling of components to the circuit board 1106.

As shown in FIG. 11, an antenna mount 1112 is coupled to the circuit board 1106 by fasteners (e.g., screws, bolts, pins, etc.) 1114 interfacing with mounting points of the circuit board 1106. The antenna mount 1112 is positioned over a center region of the circuit board 1106, such that the antenna mount 1112 is spaced apart from edges of the circuit board 1106. A plurality of cables are coupled to the antenna mount 1112, shown as a first cable 1116, a second cable 1118, a third cable 1120, and a fourth cable 1122. Various additional wiring, leads, pins, conductive paths, etc. can be used to conductively connect the first cable 1116, second cable 1118, third cable 1120, and fourth cable 1122 to various components of the circuit board 1106.

By being positioned over the center region of the circuit board 1106, the antenna mount 1112 is arranged such that at least a proximal portion of each of the cables 1116-1122 extends over the circuit board 1106, for example in a direction substantially parallel with the circuit board 1106. Such an arrangement allows for the cables 1116-1122 to extend from the circuit board 1106 without consuming additional space laterally over an edge of the circuit board 1106 (e.g., as shown for other ports such as the ethernet port 1110 which uses space beyond an edge of the circuit board 1106 to enable connection of an ethernet cable to the ethernet port 1110 as shown). The configuration of the antenna mount 1112 on the circuit board 1106 as shown allows the circuit board 1106 to be positioned with one or more edges abutting or proximate a wall of the housing. In some embodiments, the antenna mount 1112 also acts as a heat dissipator configured to facilitate heat flow off of the circuit board 1106.

Figure 12:
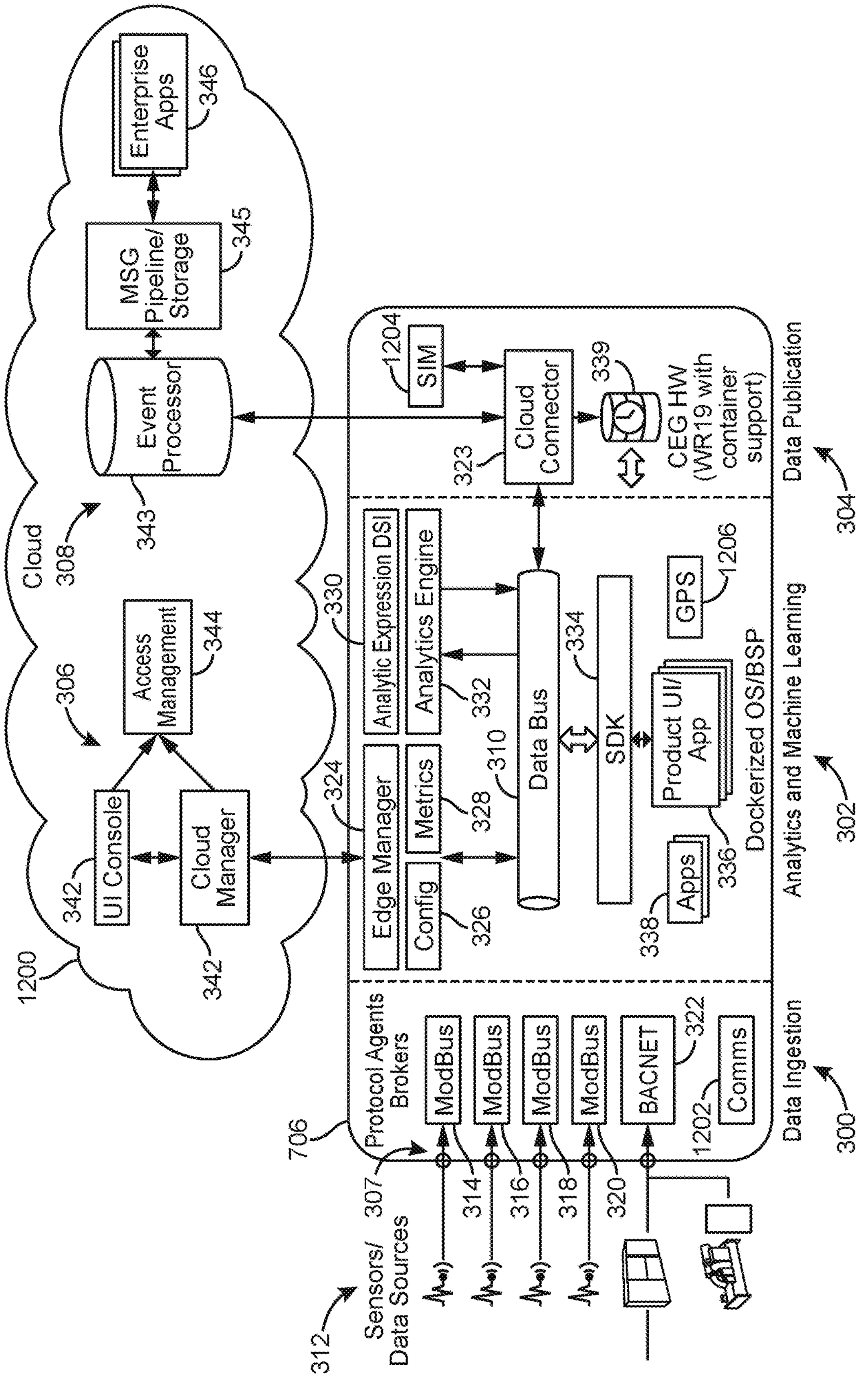
FIG. 12 is a block diagram of an architecture including a communications board of a chiller, according to some embodiments.

As shown in FIG. 12, a first antenna 1124 and a second antenna 1126 are coupled to and positioned on an exterior of the housing 1102. The first antenna 1124 is conductively connected to at least one of the cables 1116-1122, while the second antenna 1126 is conductively connected to another of the cables 1116-1122. For example, the housing 1102 can include one or more holes through which one or more of the cables 1116-1122 can extend to reach the first antenna 1124 and/or the second antenna 1126. The first antenna 1124 and the second antenna 1126 can be the antenna 936, antenna 938, and/or antenna 940 of FIG. 9, in various embodiments. In some embodiments, the first antenna 1124 is configured for reception and/or broadcasting of a first type of wireless communication (e.g., cellular communications) while the second antenna 1126 is configured reception and/or broadcasting of a second type of wireless communication (e.g., Wi-Fi, Bluetooth, other radio communications, etc.) (e.g., by virtue of different frequencies to which the antennas are physically adapted and which are associated with different types of communication modalities). The control panel 1100 is thereby adapted for communications via multiple wireless communication types and channels, and, in some embodiments, via one or more wired communication channels (e.g., via ethernet port 1110) while being physically arranged within a housing provided as a component of a chiller (e.g., manufactured together with the chiller so as to be provided together with the various components of FIG. 11 at the factory as part of the chiller).

Referring now to FIG. 12, a detailed view of the communications board 706 interacting with a cloud tier 1200 is shown, according to some embodiments. FIG. 12 can be an example architecture used to implement the various features and elements of FIG. 9 above, in some embodiments. The communications board 706 is shown as including a data ingestion layer 300, an analytics layer 302, and a data publication layer 304. The cloud tier 1200 is shown as including an analytics management portion 306 and a cloud processing portion 308. The analytics management portion 306 interoperates with the analytics layer 302 of the communications board 706 while the cloud processing portion 308 interoperates with the data publication layer 304.

The data ingestion layer 300 is configured to ingest data from multiple sources received from the sources in multiple data formats and using multiple data protocols, translate the data into a common data format, and provide the data in the common data format to a common data bus 310 (e.g., data bus 914) of the analytics layer 302. In some embodiments, the data ingestion layer 300 and elements thereof can be implemented using features for ingesting and processing streaming data and/or sets of data as described in U.S. Pat. No. 10,007,513, filed Aug. 29, 2016, U.S. Pat. No. 11,048, 498, filed Aug. 13, 2019, U.S. Pat. No. 10,572,230, filed Mar. 23, 2017, and/or U.S. Pat. No. 10,564,941, filed Mar. 23, 2017, the disclosures of which are incorporated by reference herein in their entireties. The common data format may be a Brick format, for example, or any other type of common data model. The data ingestion layer may apply tags to the data, for example tags indicating types of the entities, relationships between the entities, for example location, event, asset, and place tags. The data ingestion layer 300 can also provide various pre-processing steps, including normalizing, aligning (e.g., arranging data from multiple sources into discrete values at a common frequency/time step interval), filtering, cleaning, etc. the data received at the data ingestion layer 300 before providing such data to the data bus 310.

As shown in FIG. 12, the data ingestion layer 300 includes multiple inputs 307 (ports, pins, wireless receivers, etc.) that receive signals (data, etc.) from sources 312 and provide such signals to an MQTT agent 314, an OPCUA agent 316, a Modbus agent 318, a DDS agent 320, and a BACnet agent 322 (e.g., Protocol Agents 916 of FIG. 9). The MQTT agent 314 is configured to translate data from a MQTT protocol to a common data format used by the data bus 310 (e.g., data from an internet-of-things sensor). The OPCUA agent 316 is configured to translate data from a OPCUA protocol to the common data format. The Modbus agent 318 is configured to translate data (e.g., from a building sensor) from a Modbus protocol to the common data format. The DDS agent 320 is configured to translate data from a DDS protocol to the common data format. The BACnet agent 322 is configured to translate the data (e.g., internal data of the unit of building equipment, data from other building equipment) from a BACnet protocol to the common data format. The agents 314-322 can be selectively included and excluded depending on the data protocols of the data sources communicably coupled to the communications board 706, including in some examples by adding an agent for a new protocol via an over-the-air update when a data source using the new protocol is connected. The agents 314-322 can translate the data in real time (e.g., in substantially continuous streams) so that real-time data is provided onto the data bus 310. Such local data translation avoids latency issues which may delay data processing in alternative embodiments where such data translations are performed at an off-premises server. While the agents 314-322 can in some implementations be implemented using software agents, it should be understood that, in other implementations, the protocol brokers/translation layers may be implemented using methods other than software agents.

The data ingestion layer 706 is further shown as including communications hardware 1202. Communications hardware 1202 can include electronics components adapted for electronic communication via Wi-Fi, Bluetooth, ethernet, radio, cellular, or other digital or analog communications modalities (e.g., transceivers, receivers, modems, peripheral component interconnect express, M.2, antenna 1124 and/or antenna 1126, etc.) in various embodiments. Communications hardware 1202 can enable the data ingestion layer 300 to be quickly and easily connected to any number of sensors or other devices, for example via multiple types of wireless and/or wired communication (e.g., via Bluetooth and/or Wi-Fi in addition to communications to ports associated with Modbus agent 320, WiFi Card 930, Wireless Transceiver 932, Wired Port 934, OPCUA agent 316, MQTT agent 314, etc.). A high-scalable architecture is thereby provided for ingestion of data from various types of sensors that may be integral to a chiller, added later in upgrades and augmentations of a chiller, associated with other equipment of a building system, associated with various zones of a building, etc. as may be desired in various scenarios. The communications board 706 is thereby configured for easy sensorization of the chiller with various sensors (e.g., vibration, temperature, humidity, flow, power) via modular edge capabilities of the communications board 706.

The analytics layer 302 is configured to execute one or more of multiple types of logic, including control logic (e.g., a PID feedback control loop), expression-based event processing and/or pattern recognition, and/or one or more machine learning or artificial intelligence algorithms/routines (e.g., a machine learning algorithm specifically modified to have a smaller memory footprint thereby enabling edge execution). Such logic is performed using data in a common data format from data bus 310 and can include sending control signals to the chiller 700 (i.e., to electromechanical components that operate in accordance with such control signals to affect a condition of a building) or transmitting results to the cloud tier 1200 via a cloud connector 323 of the data publication layer 304. The analytics layer 302 can include the edge ML Engine 906, supervisory control engine 910, updates engine 908, object and point manager 918, etc. described above.

The analytics layer 302 is shown as including the data bus 310, edge manager 324, configurator 326, metrics 328, analytic expression domain specific language 330, analytics engine 332, software development kit 334, product applications 336, and other applications 338. The data bus 310, edge manager 324, configurator 326, metrics 328, analytic expression domain specific language 330, analytics engine 332, and software development kit 334 are shown as exchanging information with the data bus 310, while the other applications 338 and the product applications 336 interoperate with the data bus 310 via the software development kit 334 in the illustration shown.

The edge manager 324 interoperates with a cloud manager 340 of the analytics management portion 306 of the cloud tier 1200. The cloud manager 340 provides information and receives inputs from a user interface console 342 (e.g., a browser-based interface hosted by the cloud manager 340 and accessible via the Internet from a person computing device). The cloud manager 340 and the user interface console 342 interact with an access management system 344 which determines whether a user has authority to manage the communications board 706 (e.g., based on login credentials, etc.) and, in response to determining that the user has authority to manage the communications board 706, allowing the user to access the user interface console 342 and to interact with the cloud manager 340. An interface can displayed by the user interface console 342 providing interactions with the cloud manager 340 to manage analytics executed by the analytics layer 302. New or updated expression-based logic can be transmitted remotely to the communications board 706 to enable over the air updates of the communications board 706 and, in some scenarios, other similar edge circuitry for similar edge devices in a network.

The cloud manager 340 provides for creation of and modifications to various logic executed by the analytics layer 302. As one example, the cloud manager 340 allows a user (via user interface console 342) to select or create expression-based logic for execution by the analytics layer 302. For example, the cloud manager 340 may provide tools and methods for a real-time data flow programming language as described in U.S. Pat. No. 10,977,0101, filed Apr. 21, 2020, and/or U.S. Pat. No. 10,127,022, filed Mar. 23, 2017, the entire disclosures of which are incorporated by reference herein. The expression-based logic may enable complex event processing that can perform real-time analysis of disparate streams of data (e.g., collected on data bus 310), simultaneously perform complex pattern recognition on high frequency and asynchronous streaming data, detect events in real time (enabling immediate response such as closed loop control actions), and handle machine learning pre- and post-processing. For example, the expression-based logic may be selected or customized via the cloud manager 340 to define fault diagnosis rules based on trends in data on the data bus 310 (e.g., comparing rates of change of different variables from different data sources). Such expression-based logic can be stored at analytic expression DSL 330 and executed by analytics engine 332 of the analytics layer 302 of the communications board 706.

As another example, the cloud manager 340 is configured to train a neural network (or other machine learning or artificial intelligence model), for example on historical data of configuration, events, performance, etc. of the chiller 700 and/or other equipment units (e.g., similar equipment units serving similar buildings). The cloud manager 340 may provide the trained neural network to the edge manager 324. In some embodiments, the cloud manager 340 modifies the trained model in a manner that reduces the memory and computing resources needed to run an algorithm using the model, and provides the modified model to the communications board 706. The model can be edge-converted ("edge-ified") as described in U.S. Patent Publication No. 2020/0327371, filed Apr. 9, 2019, the entire disclosure of which is incorporated by reference herein. The modified (edge-converted, edge-ified, etc.) model may be usable by the communications board 706 use continuous streams of data as inputs from the data bus 310 and produce inferences (predictions, diagnoses, control outputs) without communication to the cloud tier 1200. The cloud manager 340 can periodically update the edge-converted model in a closed-loop manner by interoperating with the edge manager 324, for example. The edge-converted model can be stored by the edge manager 324 on the communications board 706 and used in one or machine learning algorithms, for example executed by the analytics engine 332 of the analytics layer 302. In some embodiments, the edge-converted model is provided onto data bus 310 so that it can be used by apps 338 and product apps 336 via SDK 334.

The cloud manager 340 and user interface console 342 can also enable various other automated or user-selected adjustments of settings and control logic, for example. For example, a user may select temperature setpoints, desired temperature ranges, preferences for comfort versus costs or energy or carbon savings, etc. which may be used by various control logic (e.g., PID feedback controller, extremum seeking controller, etc.), analytics, or model-based processes (e.g., model predictive control, predictive maintenance, etc.) performed by the communications board 706.

Configurator 326 of the analytics layer 302 is configured to automatically determine a configuration for the communications board 706 and the chiller 700. The configuration can include multiple parameters that tune the communications board 706 and the chiller 700 to or toward ideal performance. In some embodiments, the configurator 326 uses expression-based event processing logic to assess data from the data bus 310 and uses results of such expression-based event processing logic to determine configuration parameters. In some embodiments, the configurator 326 uses a machine learning model (e.g., an edge-converted machine learning model, trained on historical configurations of similar equipment units) to determine a configuration. In some embodiments, the configurator 326 interoperates with the cloud manager 340 to determine the configuration in a hybrid cloud/edge manner, for example with the configurator 326 and the cloud manager 340 determining different subsets of configuration parameters. In some embodiments, the configurator 326 and/or the cloud manager 340 (e.g., in coordination with the user interface console 342) perform operations for automatic configuration as described in U.S. Pat. No. 11,272,011, filed May 19, 2021, the entire disclosure of which is incorporated by reference herein.

The analytics layer 302 is also shown as including a positioning application, shown as global positioning system (GPS) application 1206. The GPS application 1206 can be implemented using a GPS chip included with the communications board 706 and adapted for determining a geographic location of the communications board 706 (and the chiller) based on signals from global positioning satellites. In some embodiments, the GPS application 1206 determines location data based on cellular network data, IP address data, and/or other source of data which can provide location-related information for the GPS application 1206. The GPS application 1206 can execute at installation of a chiller at a building site to confirm chiller location and, in some embodiments, to provide confirmation of chiller location which can be used to facilitate configuration and commissioning of the chiller and/or a building management system associated with the chiller. Location information can be provided form the GPS application 1206 to the data bus 310 for use by various apps 338 and product apps 336, by the analytics engine 332, for example for use in selecting or executing one or more artificial intelligence models, for display on a user interface, etc., in various embodiments (e.g., for executing an application that pulls weather data based on equipment location, for applying artificial intelligence with regional intelligence as in U.S. Patent Publication No. 2023/0417439 published Dec. 28, 2023, the entire disclosure of which is incorporated by reference herein). For example, the physical location data from the GPS application 1206 can be used in the analytics layer 302 (or in the cloud tier 1200) for validating the communications board 706 is at the intended customer location (e.g., validating warehouse logistics and shipping of the chiller to the correct site) and/or automatically associate the communications board 706 with other equipment and systems serving the same location, for example in an manner which can be used to optimize control and telemetry use cases for the equipment (e.g., such that a chiller including the communications board 706 is controlled in a coordinated manner with and/or otherwise based on the availability of certain equipment at the detected location).

As shown in FIG. 12, the analytics layer 302 is dockerized such that various apps 338 and product apps 336, (and analytic expressions, machine learning models, etc.) (e.g., interface generator 917) can be modularly added or removed from the analytics layer 302, for example via over-the-air updates. The apps 338 and product apps 336 can include various control logic for the chiller 700, for example. The apps 338 and the product apps 336 can include various other programs, analytics, metrics calculators, visualization generators, etc. that enable various capabilities for the chiller 700.

The communications board 706 is further shown as including the data publication layer 304. The data publication layer 304 includes cloud connector 323 and connected equipment gateway hardware (CEG HW) 339. The cloud connector 323 is configured to provide a bridge between the communications board 706 (e.g., the data bus 310) and the cloud tier 1200 (e.g., the cloud processing portion 308), for example as described in U.S. Provisional Patent Application No. 63/296,078, filed Jan. 3, 2022, the entire disclosure of which is incorporated by reference herein. The CEG HW 339 provides for data updates to and from the cloud tier 1200, for example via SDK 334. The cloud connector 323 can include antenna 1124 and/or antenna 1126 shown in FIG. 11, for example, and/or various cellular modem hardware and/or other communications hardware. As shown, the communications board 706 includes a cellular connector, shown as subscriber identity module (SIM) 1204. SIM 1204 can be a physical SIM card and/or a virtual (software-implemented SIM). In some embodiments, SIM 1204 is configured prior to delivery of the communications board 706 (and associated chiller) to a building site, for example in a factory, warehouse, or other shipping and logistics location, such that the SIM 1204 is associated with an account (e.g., customer account) associated with the building site prior to arrival of the communications board 706 at the building site. Such pre-association can enable the communications board 706 to connect automatically to the cloud tier 1200, and in particular to a particular account in the cloud tier 1200 so as to provide plug-and-play connectivity without requiring field technicians to configure the SIM 1204 and/or other aspect of the secure communications between the communication board 706 and the cloud tier 1200.

The cloud processing portion 308 of the cloud tier is shown as including an event processor 346, a message pipeline/storage 348, and enterprise applications 350. The event processor 346 may be configured to receive data and analytics outputs from the communications board 706 and store such outputs. The event processor 346 may also be configured to perform additional (e.g., higher-level) analytics and processing of such information to generate additional insights and actionable steps or recommendations relating to the chiller 700. The message pipeline/storage 348 provides for communication between the event processor 346 and enterprise applications 350. The enterprise applications 350 can include various cloud-based capabilities associated with managing, tracking, and/or affecting operation of the chiller 700 and, in some scenarios other building equipment communicable with the cloud tier 1200. For example the enterprise applications 350 may provide a distributor dashboard enabling comparison of equipment performance, events, etc. across many units of equipment, different facilities, different customers, different equipment owners, different technicians or sales representatives, etc. As another example, the enterprise applications 350 can provide a user interface (e.g., via a mobile application, via a webpage hosted by enterprise applications 350, etc.) that enables a user to view events, faults, etc.

In accordance with the above description, one implementation of the present disclosure is a chiller. The chiller includes a housing, a main chiller control board positioned in the housing, a communications board positioned in the housing, a first communication channel between the main chiller control board and the communications board, and a second communication channel between the main chiller control board and the communications board. The second communications channel provides higher bandwidth communications than the first communication channel.

The chiller can include a compressor, and the main chiller control board may be configured to control the compressor. In some embodiments, the communications board is configured to provide communications between the chiller and a network external to the chiller. In some embodiments, the communications board includes network circuitry adapted to connect to the network external to the chiller via ethernet, Wi-Fi, and cellular connection.

In some embodiments, the first communication channel uses a building networks protocol and wherein the second communications channel uses ethernet. The communications board may include a wireless card configured to provide wireless communications between the second communications board and a network external to the chiller. The communications board may provide more processing power than the main chiller control board.

In some embodiments, the communications board is programmed to execute an algorithm that determines a control setting to be used by the main control board, wherein the main chiller control board has insufficient computing resources to execute the algorithm. In some embodiments, the communications board is configured to receive an over-the-air update from an external source and cause the over-the-air update to be installed on the main chiller control board via the second communication channel.

In some embodiments, the chiller includes a screen. The communications board may be configured to control the screen based on first data from the main control board and second data from a source external to the chiller.

Another implementation of the present disclosure is a system including a chiller and a computing system remote from the chiller. The chiller includes a housing, a main chiller control board positioned in the housing, a communications board positioned in the housing and configured to enable communications between the chiller and the computing system, a first communication channel between the main chiller control board and the communications board, and a second communication channel between the main chiller control board and the communications board. The second communications channel provides higher bandwidth communications than the first communication channel.

In some embodiments, the main chiller control board is spaced apart from the main chiller control board. In some embodiments, the communications board enables communications between the chiller and the computing system selectively via an ethernet connection, a Wi-Fi connection, and a cellular connection.

In some embodiments, the main chiller control board is configured to control cooling components of the chiller. The communications board may be configured to receive an over-the-air update from an external source and cause the over-the-air update to be installed on the main chiller control board via the second communication channel.

In some embodiments, the chiller further comprises a screen. The communications board may be configured to control the screen based on first data from the main control board and second data from the computing system. In some embodiments, the communications board is programmed to execute an algorithm that determines a control setting to be used by the main control board. The main chiller control board has insufficient computing resources to execute the algorithm.

Another implementation of the present disclosure is a method of providing a chiller. The method includes installing cooling components of the chiller in housing, installing a main control board in the housing, installing a communications board in the housing, and installing a plurality of communications channels between the main control board and the communications board.

In some embodiments, the method also includes positioning the chiller in a building and establishing a network connection between the communications board and an external network without requiring installation of additional communications devices separate from the chiller. In some embodiments, establishing the network connection includes providing, by the communications board, options to provide the network connection via wired connection, Wi-Fi connection, and cellular connection. Establishing the plurality of communications channels between the main control board and the communications board may include connecting an ethernet cable between the main control board and the communications board and connecting a Modbus cable between the main control board and the communications board.

Another implementation of the present disclosure is a chiller. The chiller includes a housing, cooling components in the housing and configured to chill a fluid, control circuitry in the housing and configured to control the cooling components and an antenna conductively coupled with the control circuitry and configured to receive and transmit wireless communications. The housing is configured so as to allow wireless communications to reach the antenna.

Another implementation of the present disclosure is a chiller. The chiller includes onboard communications circuitry. The onboard communications circuitry includes a gateway for a secure overlay network, an edge-adapted artificial intelligence engine, and a communications bridge adapted for integrating data from the chiller with a digital twin.

Another implementation of the present disclosure is a method including providing, to a chiller prior to delivery of the chiller to a building, a communications board such that the communications board is electronically communicable with a main control board of the chiller, configuring, prior to the delivery of the chiller to the building, remote connectivity of the communications board, and automatically using the remote connectivity of the communications board to establish a connection between the chiller and a remote server in response to installation of the chiller at the building.

Configuring the remote connectivity of the communications board can include configuring a secure overlay network leveraging security programming natively running on the communications board. The communications board can include a common data bus, where the communications board is programmed to provide containerized applications configured to exchange data with the common data bus. The containerized applications can include edge-adapted artificial intelligence agent.

The method can include providing, to the chiller prior to the delivery of the chiller to the building, a plurality of modular communication interfaces adapted for a plurality of types of electronic communication and connected to the communications board, and connecting, at the building, the communications board to a plurality of sensors using the plurality of types of electronic communication via the plurality of modular communication interfaces. The plurality of types of electronic communication can include Bluetooth and Modbus or BACNet communications. The method can include automatically detecting, by the communications board, other equipment installed at the building and changing, by the communications board, a setting for the main control board based on the other equipment installed at the building.

The method can include providing the communications board to the chiller by wiring a serial port of the communications board to the main control board and connecting an ethernet port of the communications board to the main control board, fastening an antenna mount to mounting points of the communications board, and providing a cable from the antenna mount to an antenna coupled to an exterior of a housing of the chiller.

The method can include detecting, by the communications board, a location of the chiller and providing the location of the chiller to a computing system via the remote connectivity. In some embodiments, configuring, prior to the delivery of the chiller to the building, the remote connectivity of the communications board includes associating a subscriber identity module of the communications board with an account associated with the building.

The method can include providing, to a technician application executing on the remote server, data relating to the chiller via the remote connectivity and altering, via the remote connectivity and the communications board, operations of the main control board in response to a user input to the technician application.

Another implementation of the present disclosure is a method including establishing, upon installation of a chiller at a building, connectivity between a communications board of the chiller and a remote server using communications settings established prior to installation of the chiller at the building. The method can also include receiving, at the chiller from the remote server via the connectivity, a software update for a main control board of the chiller separate from the communications board and providing, by the communications board, the software update onto the main control board. The method can also include operating, by the main control board executing in accordance with the software update, the chiller to chill a fluid for cooling the building. In some embodiments, the method includes establishing communications in a plurality of communication protocols between the communications board and a plurality of sensors and devices such that the plurality of sensors and devices provide data onto a common data bus of the communications board.

In some embodiments, the method includes providing the communications board with a plurality of modular applications exchanging data with the common data bus and including an artificial intelligence engine. In some embodiments, establishing the connectivity includes establishing as secure overlay network interacting natively with the common data bus. The plurality of communication protocols can including Wi-Fi and Bluetooth. The plurality of communication protocols can include OPC Unified Architecture.

In some embodiments, providing, by the communications board, the software update onto the main control board uses a first communication channel between the communications board and the main control board. The method can also include exchanging data between the communications board and the main control board using a second communication channel, with the first communication channel being higher bandwidth than the second communication channel.

The method can also include establishing the communications settings by creating an association between a subscriber identity module of the chiller and an account associated with the building prior to delivery of the chiller to the building. The method can also include executing a program on the communications board to determine a setting for use by the main control board, where the main control board has insufficient processing power for executing the program.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A chiller comprising:
- a circuit board;
- a housing;
- a first antenna and a second antenna positioned at an exterior of the housing;
- an antenna mount coupled to the circuit board such that the antenna mount is disposed over the circuit board and spaced apart from a perimeter of the circuit board;
- a first cable extending from the antenna mount to the first antenna via a hole in the housing; and
- a second cable extending from the antenna mount to the second antenna via the hole or an additional hole in the housing.

2. The chiller of claim 1, wherein the first antenna provides for cellular communications.

3. The chiller of claim 1, wherein the first cable is coupled to the antenna mount at a proximal end of the first cable such that the proximal end of the first cable is parallel with the circuit board over a center region of the circuit board.

4. The chiller of claim 3, wherein the proximal end of the first cable extends from the antenna mount in a first direction towards a first edge of the circuit board.

5. The chiller of claim 4, wherein the first edge of the circuit board is positioned along a wall of the housing.

6. The chiller of claim 1, further comprising a control board spaced apart from the circuit board, wherein the control board is configured to output control signals to cooling components of the chiller, and wherein the circuit board is configured to enable communications between the chiller and a network external to the chiller.

7. The chiller of claim 6, wherein the circuit board is configured to receive an update from the control board via the network and install the update on the control board.

8. The chiller of claim 6, further comprising:
- a first communication channel between the control board and the circuit board; and
- a second communication channel between the control board and the circuit board, wherein the second communication channel provides higher bandwidth communications than the first communication channel.

9. The chiller of claim 1, wherein the housing contains the circuit board, wherein the housing comprises a door openable to provide access to the circuit board from outside the housing.

10. The chiller of claim 1, further comprising an ethernet port coupled to the circuit board at the perimeter of the circuit board.

11. The chiller of claim 1, wherein the second antenna provides for WiFi communications.

12. A system, comprising:
- a chiller comprising:
  - cooling components configured to chill a fluid;
  - a housing coupled to the cooling components;
  - a first antenna and a second antenna positioned at an exterior of the housing;
  - a circuit board positioned in the housing and comprising a plurality of mounting points;
  - an antenna mount fastened to the plurality of mounting points such that the antenna mount is spaced apart from a perimeter of the circuit board;
  - a first cable extending from the antenna mount to the first antenna and a second cable extending from the antenna mount to the second antenna;
- a first device separate from the chiller and communicable with the circuit board via the first antenna using a first type of wireless communication; and
- a second device separate from the chiller and communicable with the circuit board via the second antenna using a second type of wireless communication.

13. The system of claim 12, wherein the first type of wireless communication is cellular communications and the second type of wireless communication is WiFi communications.

14. The system of claim 12, wherein the first type of wireless communication is cellular communications and the second type of wireless communication is Bluetooth communications.

15. The system of claim 12, further comprising an ethernet port coupled to the circuit board at the perimeter of the circuit board.

16. The system of claim 12, wherein the antenna mount is positioned over processing components in a center region of the circuit board.

17. The system of claim 16, wherein the first cable is coupled to the antenna mount at a proximal end of the first cable such that the proximal end of the first cable is parallel with the circuit board over the center region of the circuit board.

18. The system of claim 17, wherein the proximal end of the first cable extends from the antenna mount in a first direction towards a first edge of the edges of the circuit board, wherein the first edge of the circuit board is positioned along a wall of the housing.

19. The system of claim 12, further comprising a control board spaced apart from the circuit board, wherein the circuit board is programmed to execute an algorithm that determines a control setting to be used by the control board, wherein the control board has insufficient computing resources to execute the algorithm.

20. A method comprising:

installing, at a factory, a circuit board in a chiller;

coupling, at the factory, an antenna mount to a plurality of mounting points of the circuit board;

connecting, with a first cable and a second cable, the antenna mount to a first antenna and a second antenna positioned at an exterior of a housing included with the chiller, wherein the first cable and the second cable extend from the antenna mount to the first antenna and the second antenna through a hole or an additional hole in the housing;

delivering the chiller to a building site; and connecting, via the first antenna or the second antenna, the circuit board to a wireless communications network at the building site.

* * * * *